United States Patent [19]

Pryor et al.

[11] 4,119,216
[45] Oct. 10, 1978

[54] SAWMILL STACKER ASSEMBLY MODULE

[76] Inventors: Roy R. Pryor; Harold A. Pryor, both of P.O. Box 26, Woodville, Tex. 75979

[21] Appl. No.: 747,553

[22] Filed: Dec. 6, 1976

[51] Int. Cl.² ............................................. B65G 59/08
[52] U.S. Cl. .................................... 214/6 C; 198/413; 214/1 BD
[58] Field of Search ............ 214/6 C, 1 BD; 198/411, 198/412, 413, 485, 746

[56] References Cited

U.S. PATENT DOCUMENTS

| | | | |
|---|---|---|---|
| 2,985,323 | 5/1961 | Wilson et al. | 214/6 C |
| 3,050,198 | 8/1962 | Schmunk et al. | 214/6 C |
| 3,070,240 | 12/1962 | Barriol | 214/6 C |
| 3,384,249 | 5/1968 | Greenberger | 214/6 C |
| 3,662,907 | 5/1972 | Nakajo | 214/77 R |
| 3,712,460 | 1/1973 | Kitajima | 198/746 |

*Primary Examiner*—Albert J. Makay
*Assistant Examiner*—Ross Weaver
*Attorney, Agent, or Firm*—Bard & Groves

[57] ABSTRACT

An improved fully mechanized sawmill is provided which is composed of structurally independent modules which are removably mounted on a platform composed of a plurality of side-by-side longerons supported horizontally on files of spaced-apart vertical piers and columns. The longerons provide horizontal stress support for the platform along the files of piers and columns perpendicularly to the cutting axis of the sawmill, and the modules mounted thereon provide horizontal stress support for the platform along the ranks of the piers and columns parallel to the cutting axis. In addition, improved mechanisms and techniques are provided for handling and selecting the sawlogs to be cut, for selecting and distributing the pieces cut therefrom according to shape and utility, and for stacking and handling the distributed pieces at preselected locations according to shape and utility. In particular, the stacker assembly comprises a plurality of lifting arms fixedly positioned at one end on a rotatable cross-bar. Rotation of the cross-bar elevates the lifting arms. Each lifting arm includes a stop member, and at least one of the lifting arms includes a retractable clamping tooth for drawing timbers or ties into locking engagement with the stop members. Elevation of the lifting arms deposits the timbers or ties for transport to another location.

19 Claims, 39 Drawing Figures

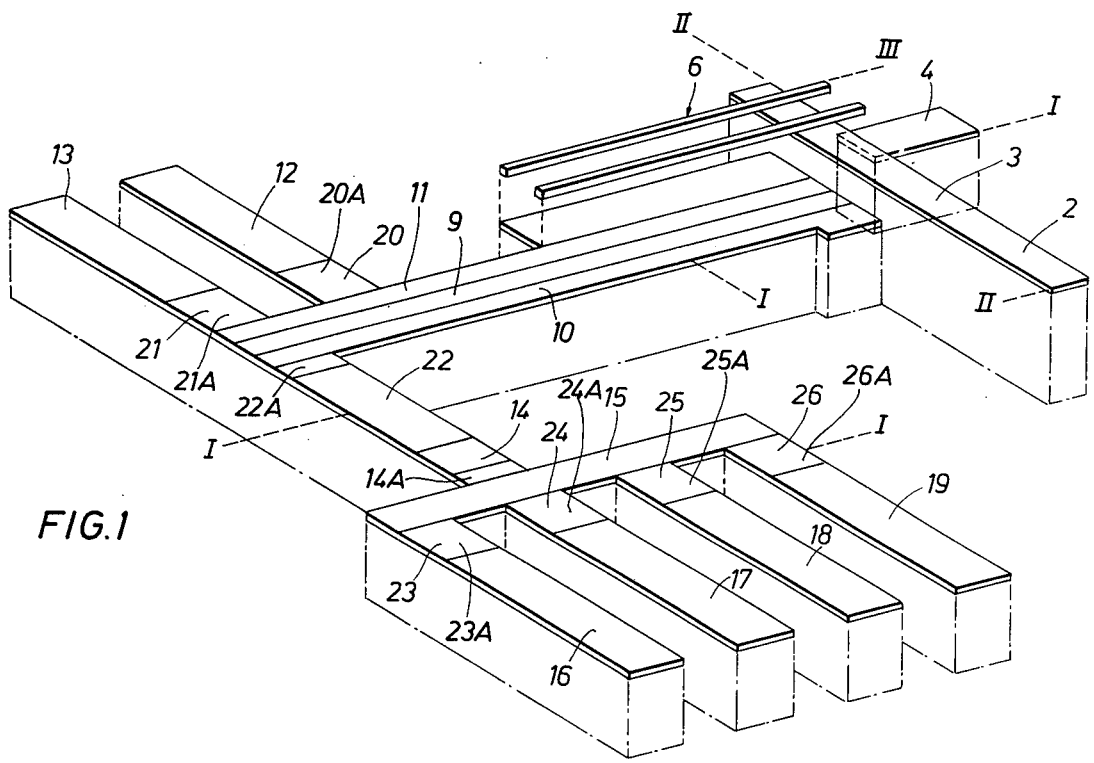
FIG.1
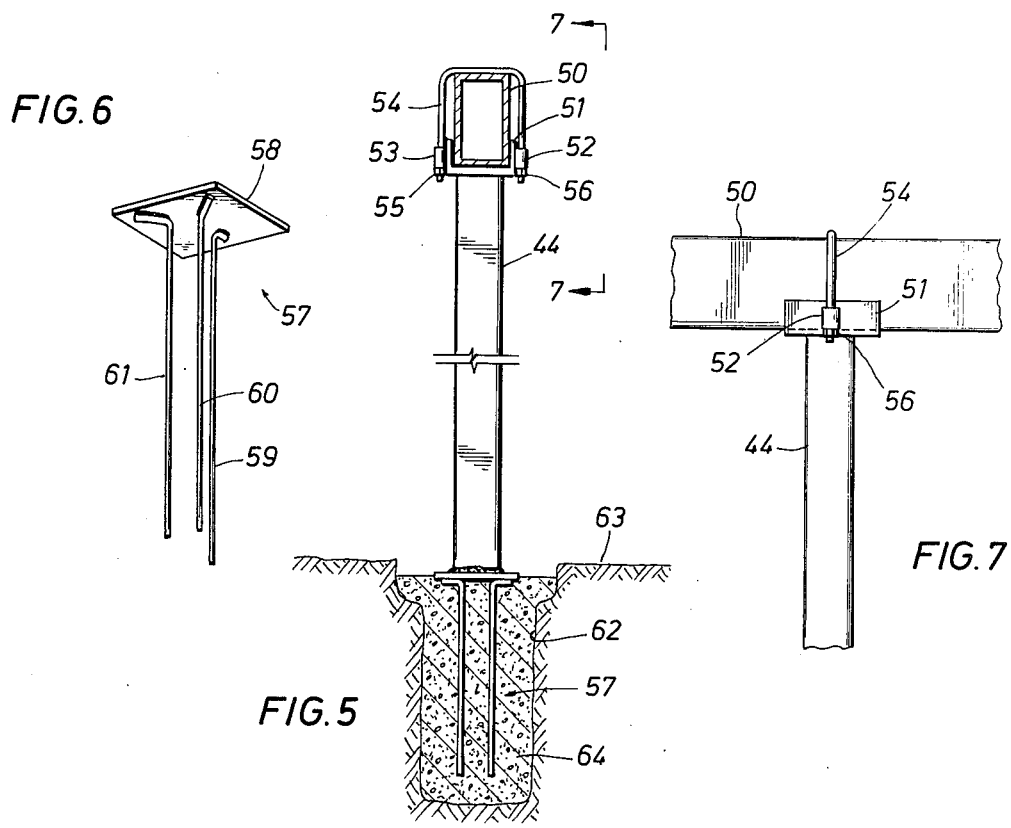
FIG.6
FIG.5
FIG.7

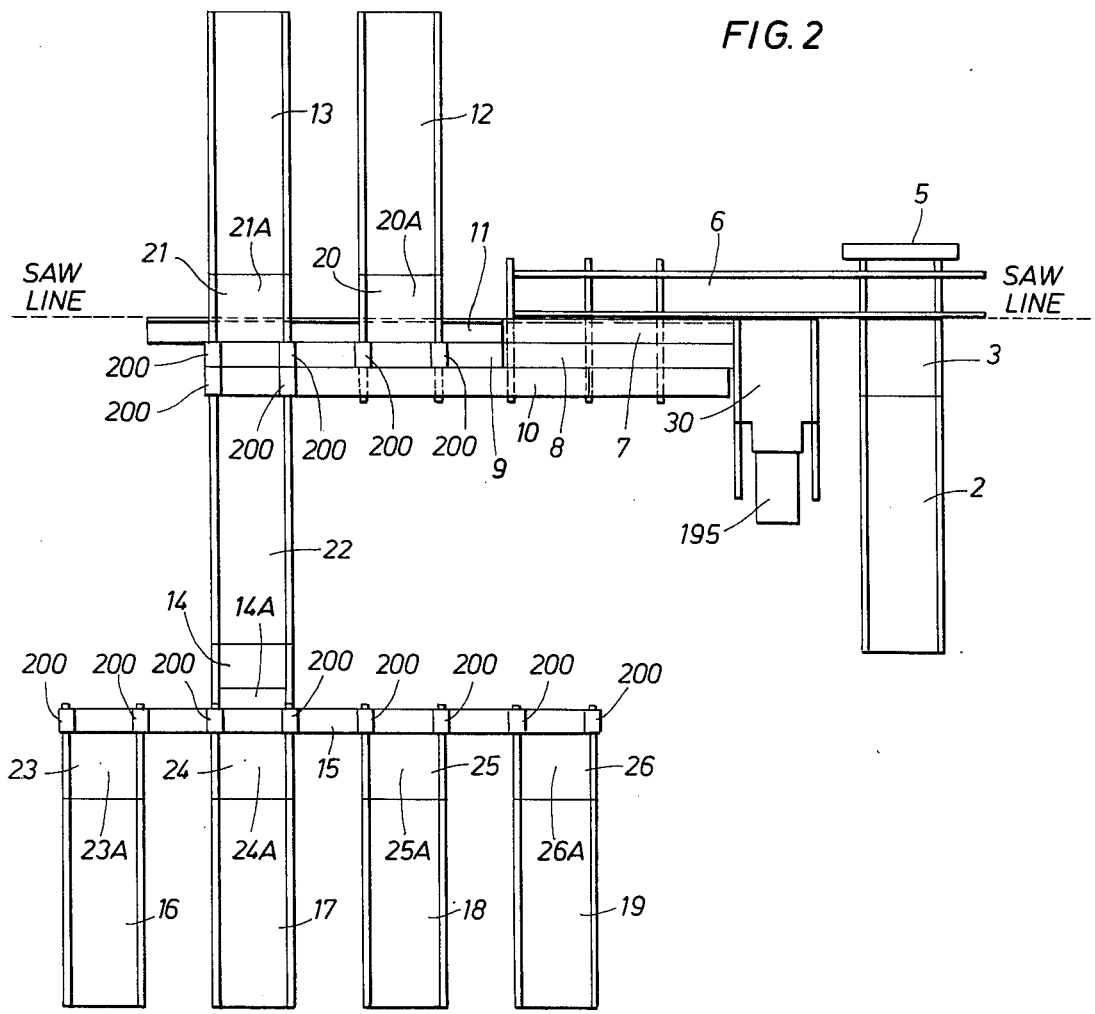
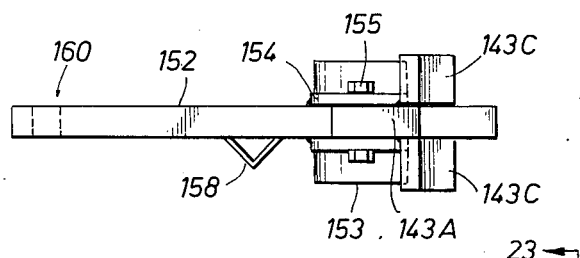
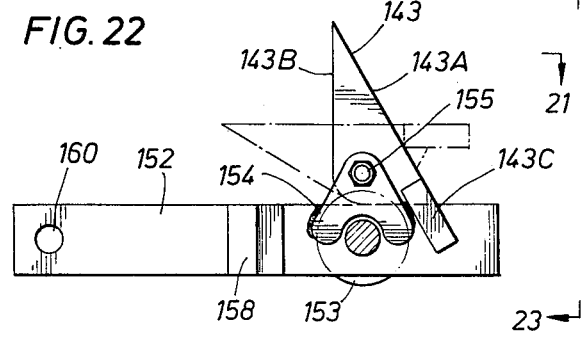

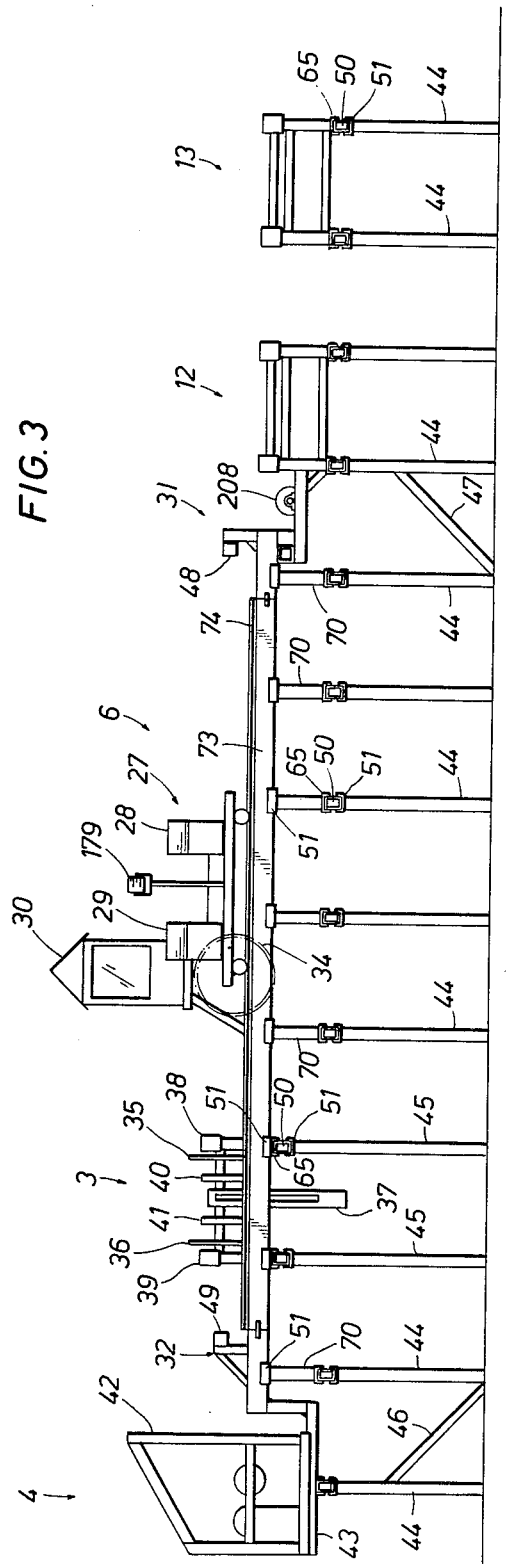
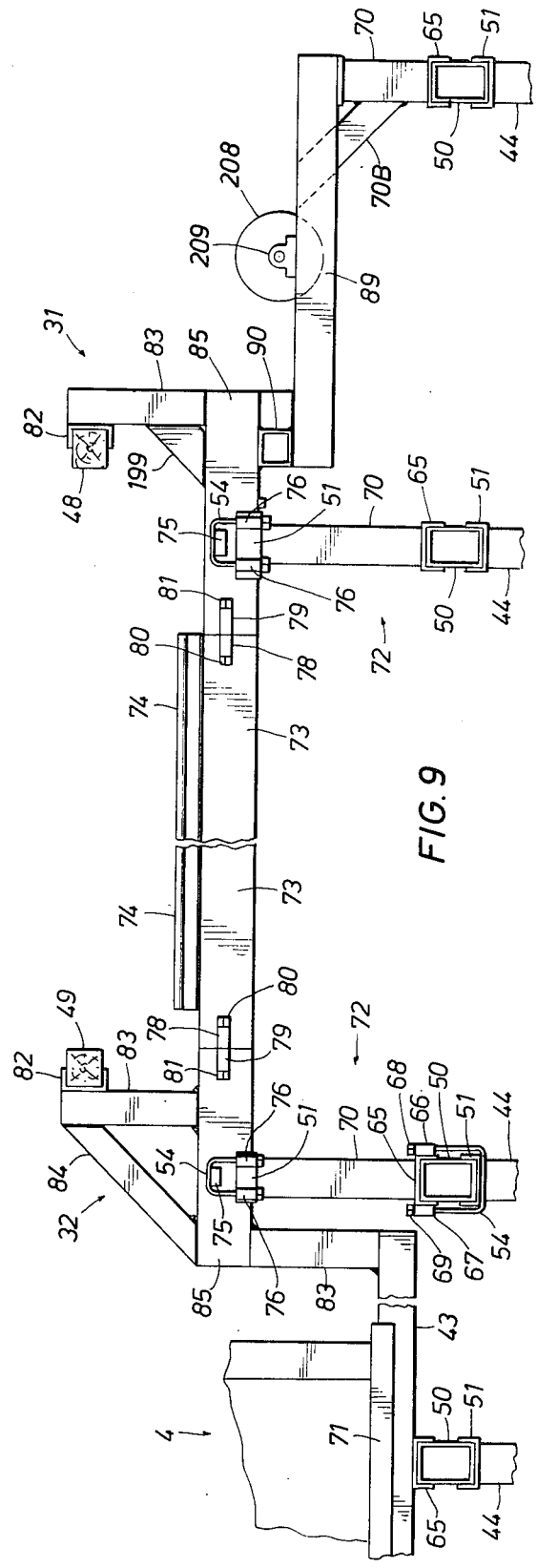

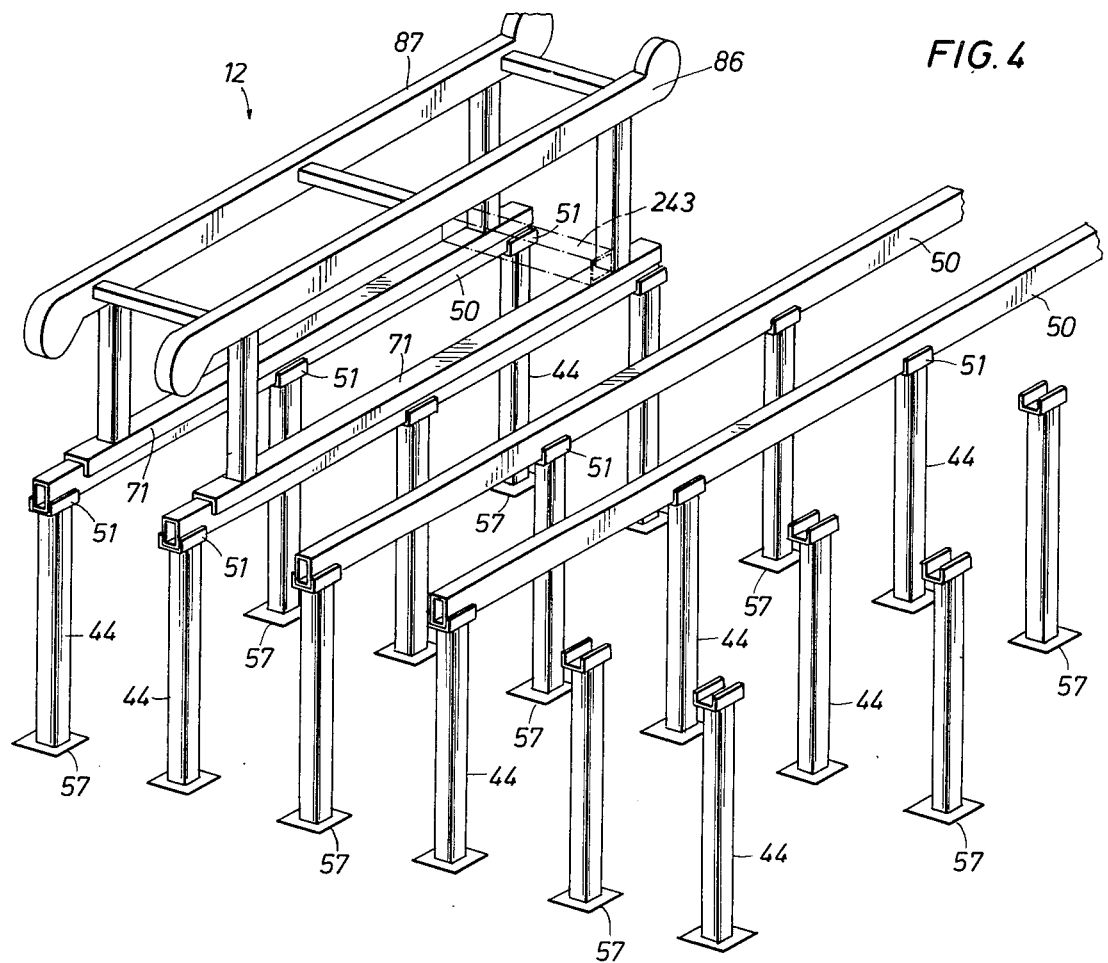
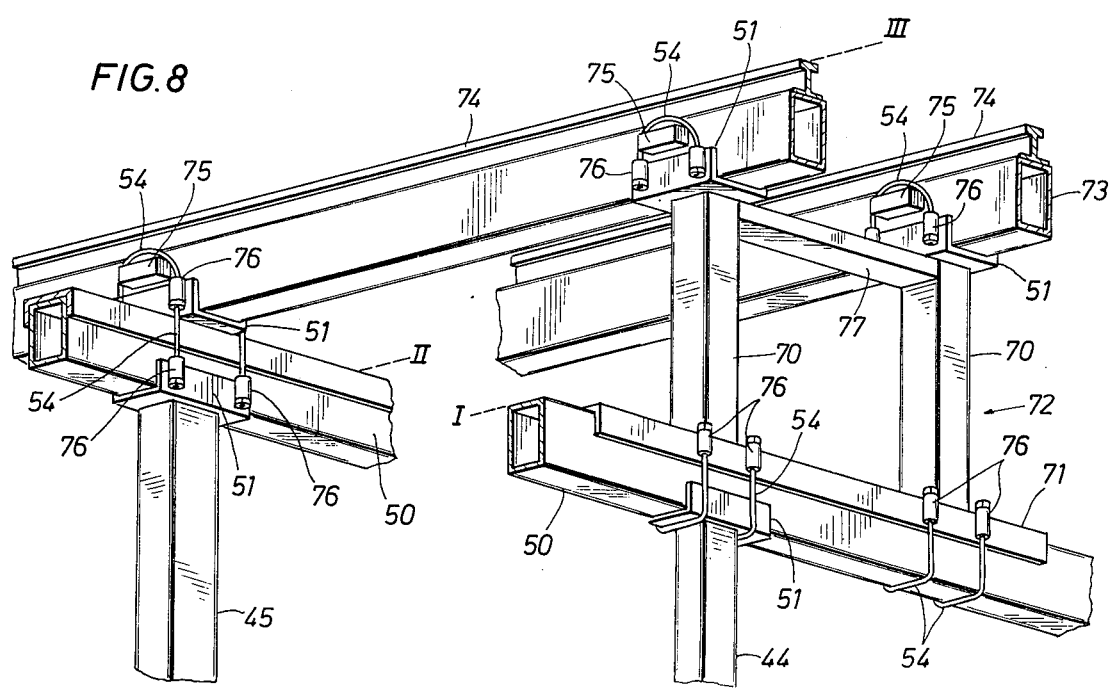

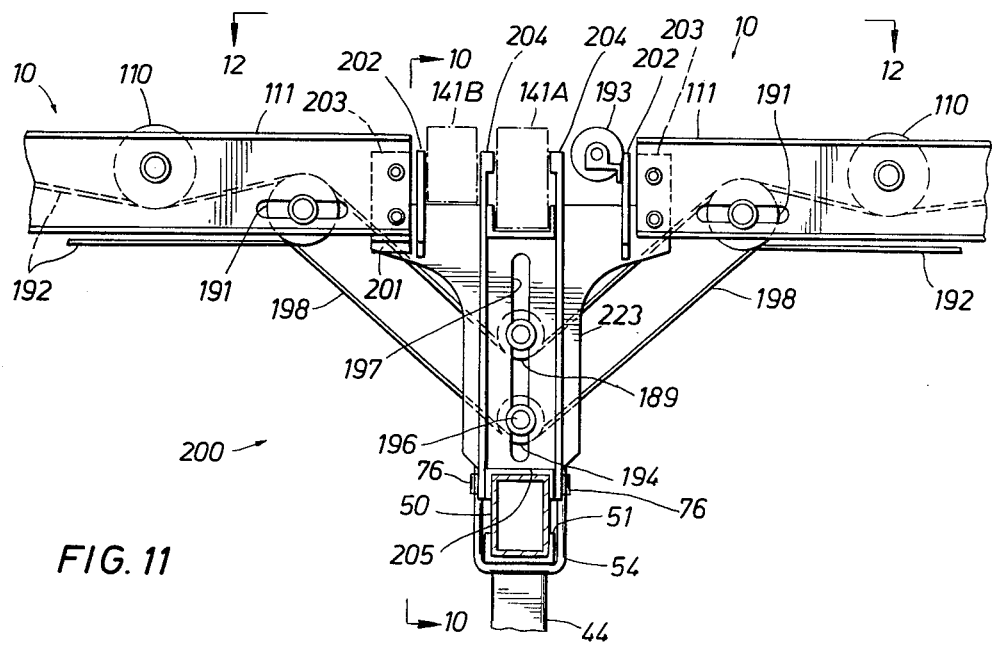
FIG. 11
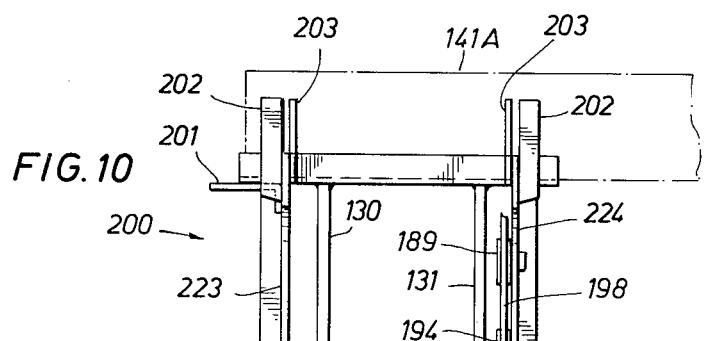
FIG. 10
FIG. 12
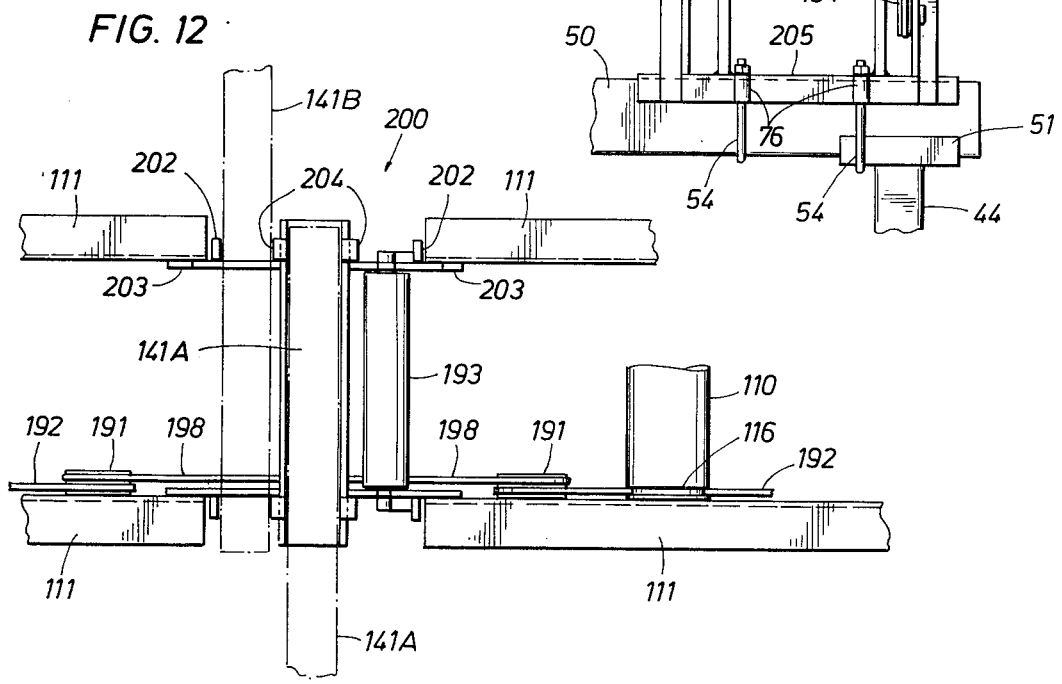

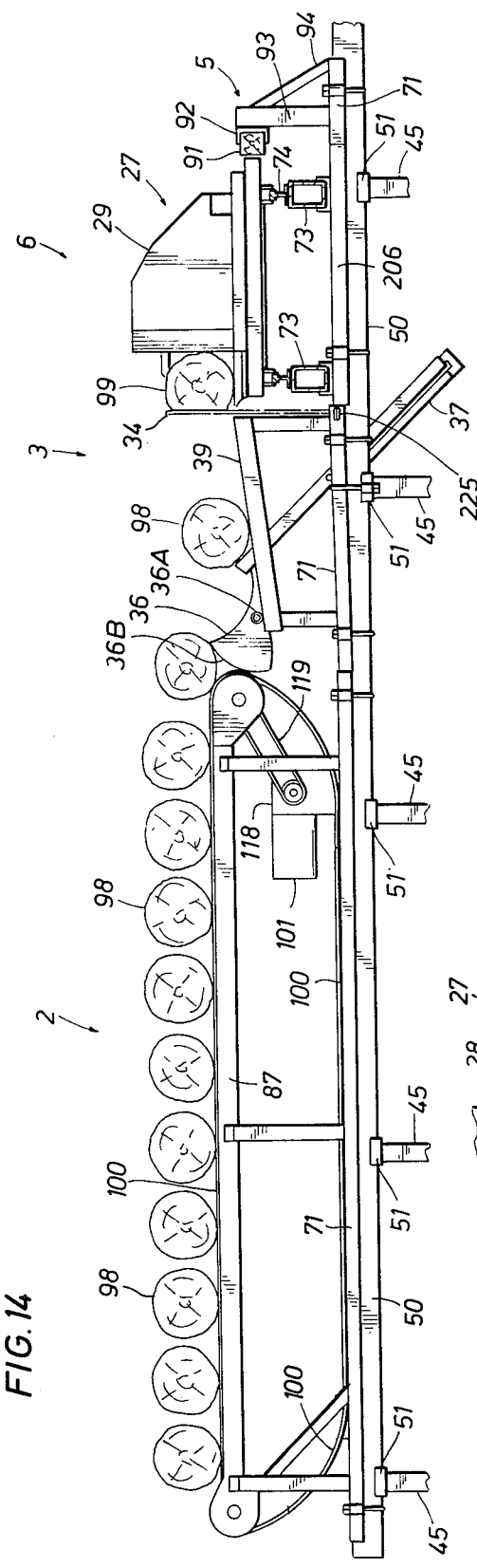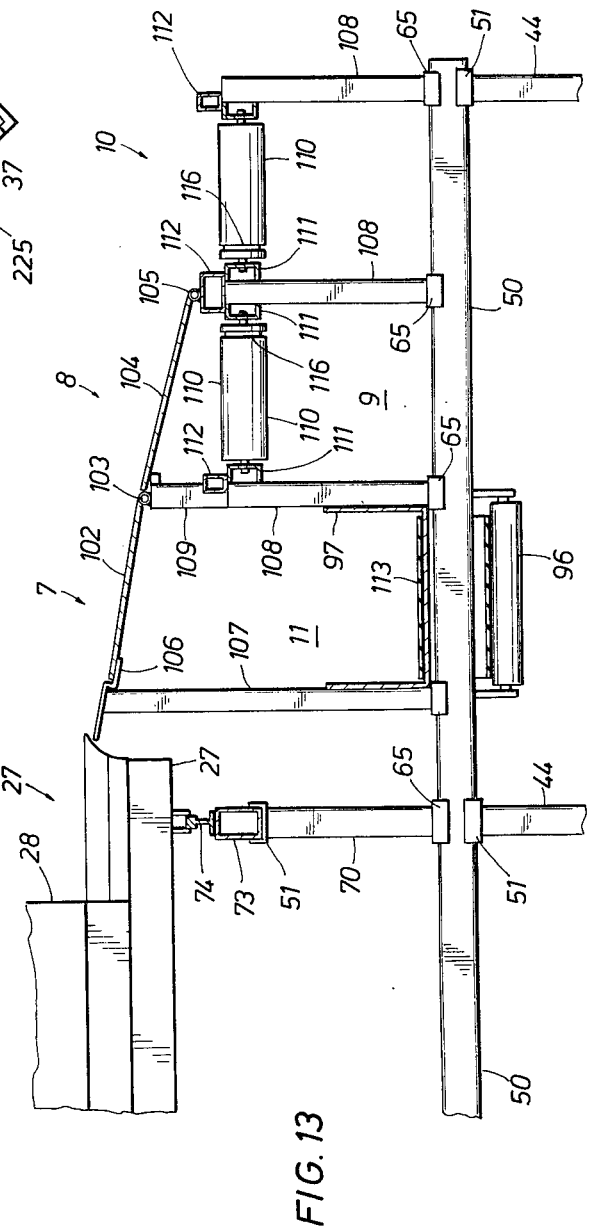
FIG. 14
FIG. 13

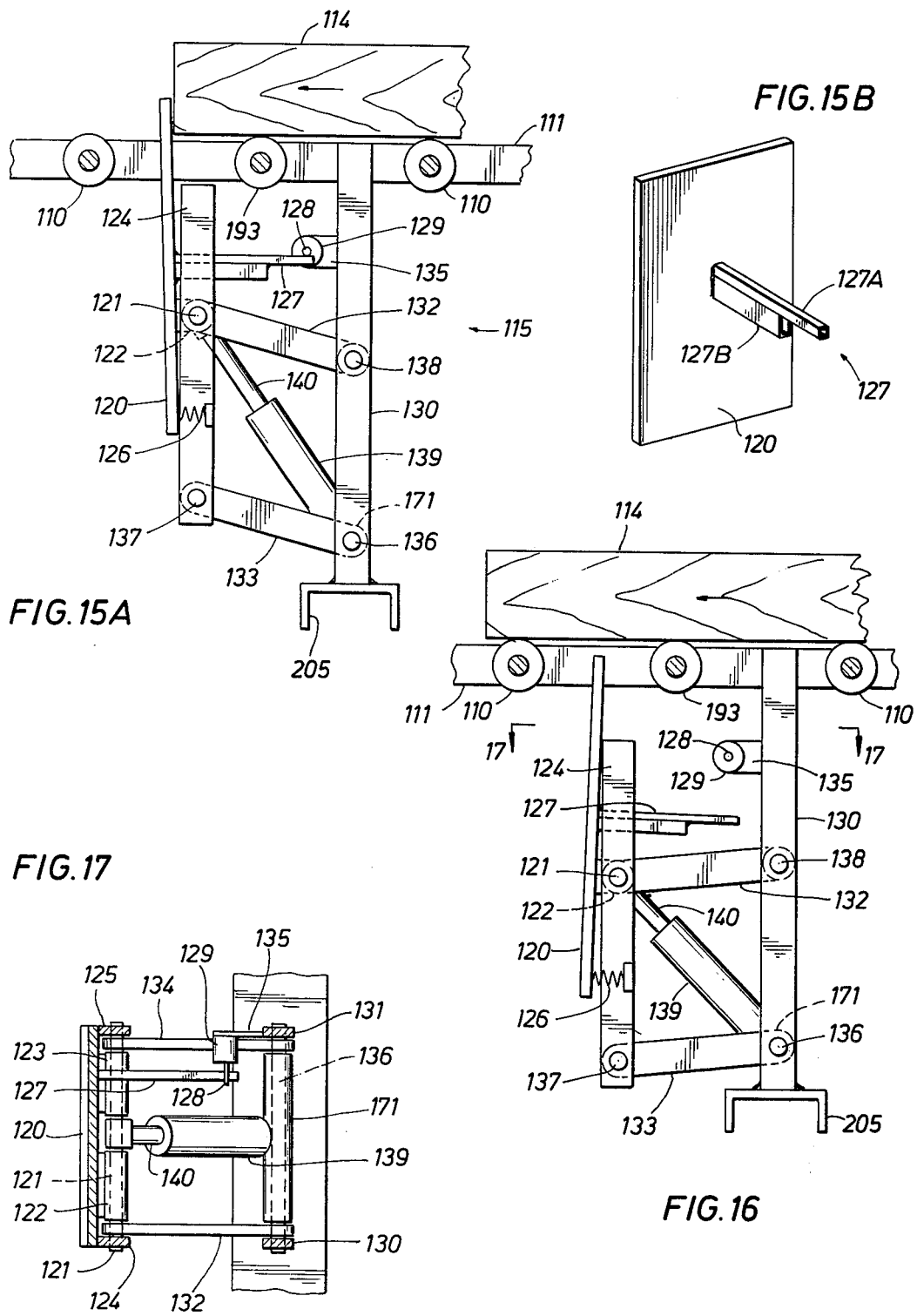

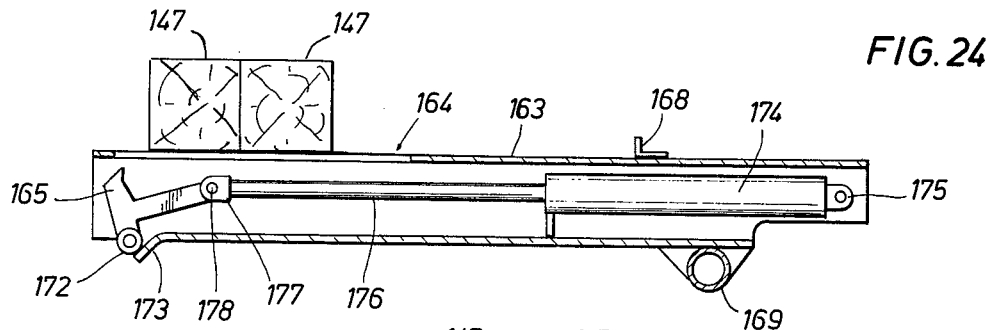
FIG. 24
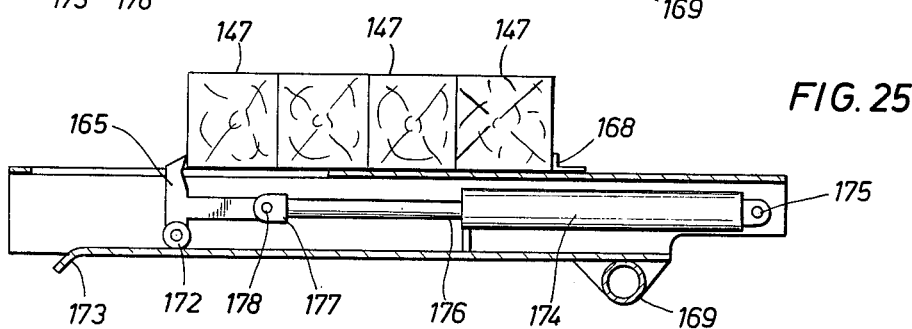
FIG. 25
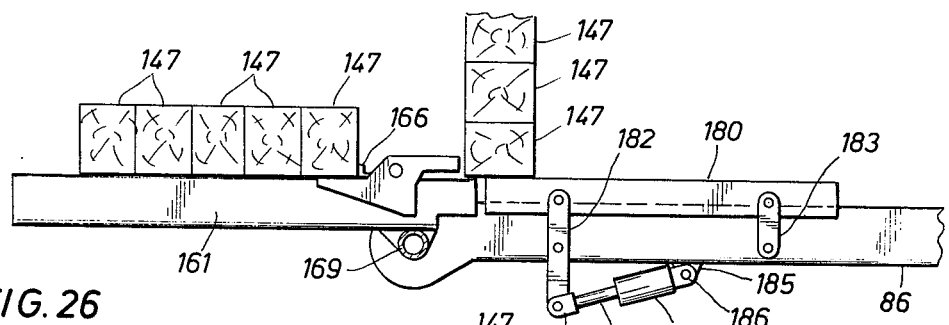
FIG. 26
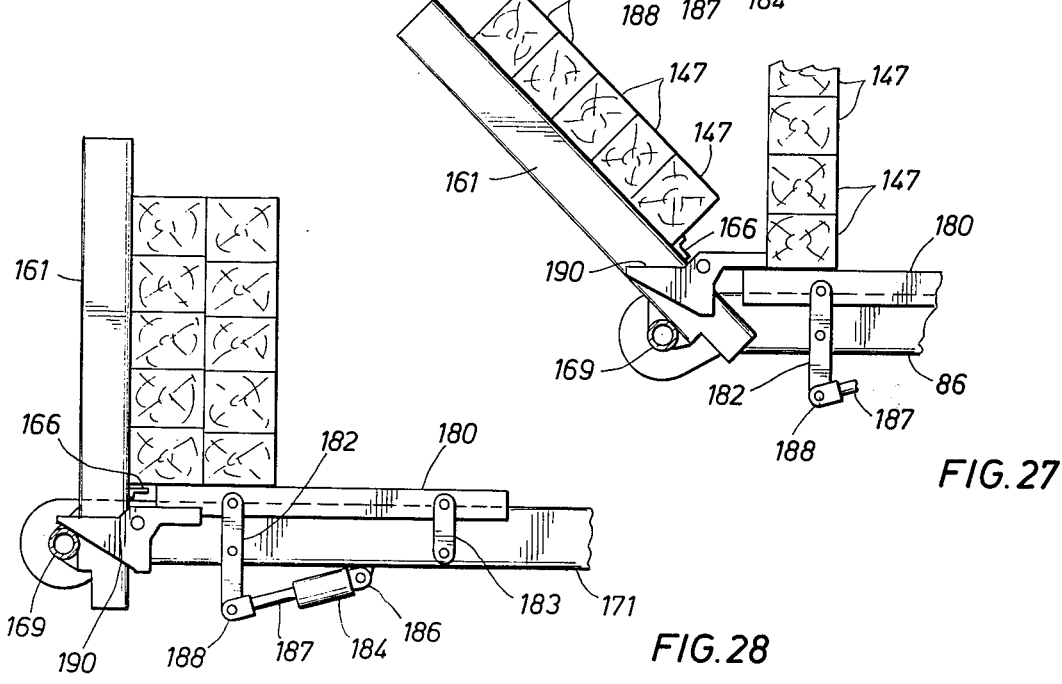
FIG. 27
FIG. 28

4,119,216

SAWMILL STACKER ASSEMBLY MODULE

BACKGROUND OF INVENTION

This invention relates to improved sawmill methods and apparatus, and more particularly relates to an improved sawmill design and operating concept. In addition, the invention relates to a novel sawmill concept wherein improved methods and apparatus are provided for performing certain of the various functions now performed in sawmills of conventional design.

It is well known that trees are harvested to provide lumber and wood pulp, and that such felled trees are carried to sawmills for this purpose after being detopped and delimbed, and perhaps also debarked. It is also well known that the sawlogs are sliced into lumber, railroad ties or timbers, and the like, by longitudinally carrying them to and from a revolving circular saw. It is further well known to provide mechanical devices for moving and handling the sawlogs in the sawmill, and also to provide other such devices for moving and handling the lumber and timbers which are produced. What is not well known is that, because of economic and social changes occurring during the past few decades, a need has arisen for a different type of sawmill. More particularly, what is required is a sawmill which is simpler, easier, cheaper and much quicker to erect and put into operation, which is also operable with a minimum number of persons, which is simpler and easier to maintain and repair, and which may be conveniently disassembled for removal and re-erection at another operating site.

A sawmill may be characterized as a system wherein certain functions or steps in a process are performed. The initial point in the process may be considered to be the "log deck" where sawlogs are positioned in a manner such that they may be taken, one at a time, to be cut into lumber and the like. Thus, a "nose section" is preferably provided between the log deck and the carriage and saw section for the purpose of selecting and transferring each sawlog to the carriage which travels back and forth between a revolving circular saw blade.

When a slice is taken from a sawlog or cant which is secured on the carriage, it may be either a board or timber, or it may be a so-called "slab" which is useless for purposes of providing lumber. It is desirable to segregate different pieces at the time they are cut from the sawlog, and thus means is preferably provided for depositing a slab on a first conveyor section leading to a chipper or the like, and for depositing lumber and timber-sized pieces on two or more other different conveyors leading, respectively, to lumber and railroad tie "decks."

It will be apparent from the foregoing that the typical sawmill is a large and complex system which is expensive and time-consuming to install and put into operation. However, the cost and complexity of sawmills has been greatly enhanced, during recent years, by the need to mechanize as much of the operation as possible. This, in turn, has resulted in making sawmills relatively permanent installations, which is inconsistent with an inherent need to be moved, from time-to-time, to move convenient sites. Accordingly, the many small, relatively portable sawmills of the past have now been largely replaced by a proportionately fewer number of much larger and relatively permanently installed sawmills which are, in turn, completely dependent on a transportion system which can accumulate and supply sawlogs from a wide area.

Accordingly, there has long been a need for a mechanical sawmill which requires a minimum number of personnel to operate, but which is also capable of being erected in a shorter length of time, which can be disassembled and removed to another operating site without effectively being destroyed as an operating unit, and which is simpler and therefore easier and cheaper to maintain. The various features and techniques which are employed to provide the large sawmills of the prior art are inherently inconsistent with providing all of these features in the same operating unit, and thus simplicity and portability have accordingly been sacrificed in favor of mechanization.

These disadvantages of the prior art are overcome with the present invention, and novel sawmill methods and apparatus are herewith disclosed for providing a sawmill which is operable with a minimum number of persons, which is relatively simple and quick to erect and put into operation at a substantially lower cost, which may be easily disassembled and reassembled at a new location, and which further includes improved and novel component sections for performing various of the aforementioned functions or steps.

SUMMARY OF INVENTION

In a preferred form of the present invention, a novel sawmill design is provided which is basically comprised of a platform formed by a plurality of piers or columns arranged in ranks and files and carrying a plurality of hollow longitudinal structural members hereinafter referred to as "longerons" which extend or lie across the various files of piers or columns to provide two preselected functional or operating levels. The various operating sections of the mill is therefore composed of a plurality of "modules" which are merely set down in straddle fashion on the longerons at various locations relative to the vertical cutting plane or "saw line" of the mill, as well as with respect to the two operating levels.

As will hereinafter be apparent, mounting the modules on a platform of this type can be done in only a few days, and thus a sawmill of this type can also be erected in a fraction of the time required to erect a conventional sawmill. More important, however, a sawmill of the type contemplated by the present invention can be disassembled and re-erected at another site by merely unfastening and removing the modules from the longerons, (as well as disconnecting the various pneumatic and electrical conduits and connections which are necessarily provided between the various modules).

It will be seen in the detailed description hereinafter provided that the platform is itself a feature of the present invention, wherein the platform is basically a plurality of vertical support members arranged in a rank and file to support a plurality of longerons carried by files of these vertical members at one of two operating levels or elevations. The longerons, which connect the files of piers or columns, provide strength to the assemblement of piers, columns and longerons, in a lateral direction perpendicular to the cutting line of the sawmill, and the modules which straddle and rest on the longerons connect and strengthen the assembled sawmill in the lateral direction parallel to the cutting line.

Although a sawmill constructed in this fashion will basically perform the same functions as those performed or sought to be performed by conventional sawmills, redesign of the sawmill to incorporate the modular concept has permitted or required redesign of the modules whereby they are structurally independent of each other (except for interconnection of electrical cables and pneumatic hoses, etc.). Thus, many if not all of the various modules are not limited in usefulness to the sawmill system and method of the present invention, but may be effectively interconnected in and operated as a part of a conventional sawmill. For example, the various log, lumber and tie deck assemblies hereinafter described are substantial improvements over corresponding portions of conventional sawmills, and the lumber and tie stacker assemblies may be used with particular advantage in any type of sawmill or other similar system, as will hereinafter be apparent.

Another feature of the present invention is the provision of various novel devices and techniques for mechanically handling not only the sawlogs which are sought to be cut, but also the boards, timbers and other pieces severed therefrom. In addition to the aforementioned lumber and tie stacker apparatus, novel and improved means is provided with the carriage and saw section or module for selectively depositing the saw several pieces on one of three different conveyor sections depending on whether the piece is a slab, a plank or board, or a railroad tie or other like size of timber. Also, novel routing means is provided for transferring boards or ties from the conveyor sections to selected ones of a plurality of lumber and tie deck assemblies and other components of the system, all without the use of any manual labor other than the sawmill operator. Accordingly, not only is the sawmill of the present invention cheaper and easier to erect, it may ideally be operated by only one person as will hereinafter be apparent.

These and other features and advantages of the present invention will become apparent from the following detailed description, wherein reference is made to the figures of the accompanying drawings.

IN THE DRAWINGS

FIG. 1 is a simplified conceptual representation of the operating levels of a sawmill embodying the concept of the present invention.

FIG. 2 is a simplified functional representation of the various functional modules, in a sawmill as depicted in FIG. 1, with respect to its sawline or cutting axis.

FIG. 3 is a simplified pictorial representation of a platform suitable for the purposes of the present invention.

FIG. 4 is a more detailed pictorial representation of a portion of the structure illustrated in FIG. 3.

FIG. 5 is a simplified pictorial representation of one of the components of the structure illustrated in FIG. 4.

FIG. 6 is a simplified pictorial representation of one of the parts of the component depicted in FIG. 4.

FIG. 7 is a simplified pictorial representation of another part of the component depicted in FIG. 4.

FIG. 8 is a pictorial representation of another portion of the supporting platform depicted in FIG. 3.

FIG. 9 is a pictorial representation of another different portion of the structure depicted in FIG. 3.

FIG. 10 is a pictorial representation of a further different portion of the structure depicted in FIG. 3.

FIG. 11 is a pictorial view of a portion of one of the components of the sawmill depicted generally in FIG. 2.

FIG. 12 is another different view of the structure depicted in FIG. 11.

FIG. 13 is a simplified pictorial view of another of the component parts of the sawmill depicted generally in FIG. 2.

FIG. 14 is a simplified pictorial view of another portion of the sawmill depicted generally in FIG. 2.

FIG. 15 is a pictorial representation of another component of the sawmill depicted in FIG. 2.

FIG. 16 is a different representation of the apparatus depicted in FIG. 15.

FIG. 17 is another view of the apparatus depicted in FIGS. 15 and 16.

FIG. 21 is a pictorial representation of a portion of the apparatus depicted in FIGS. 18-20.

FIG. 22 is another different pictorial representation of the apparatus illustrated in FIG. 21.

FIG. 23 is a further different pictorial view of a portion of the apparatus depicted in FIGS. 21 and 22.

FIG. 24 is a pictorial representation, partly in cross section, of the internal details of a portion of the apparatus depicted in FIG. 18.

FIG. 25 is another view of the apparatus depicted in FIG. 24.

FIG. 26 is a pictorial representation of the details of another portion of the apparatus depicted in FIG. 18 illustrating the position of certain components during its operation.

FIG. 27 is another view of the apparatus depicted in FIG. 26.

FIG. 28 is another different view of the apparatus depicted in FIGS. 26 and 27.

DETAILED DESCRIPTION

Figure 18:
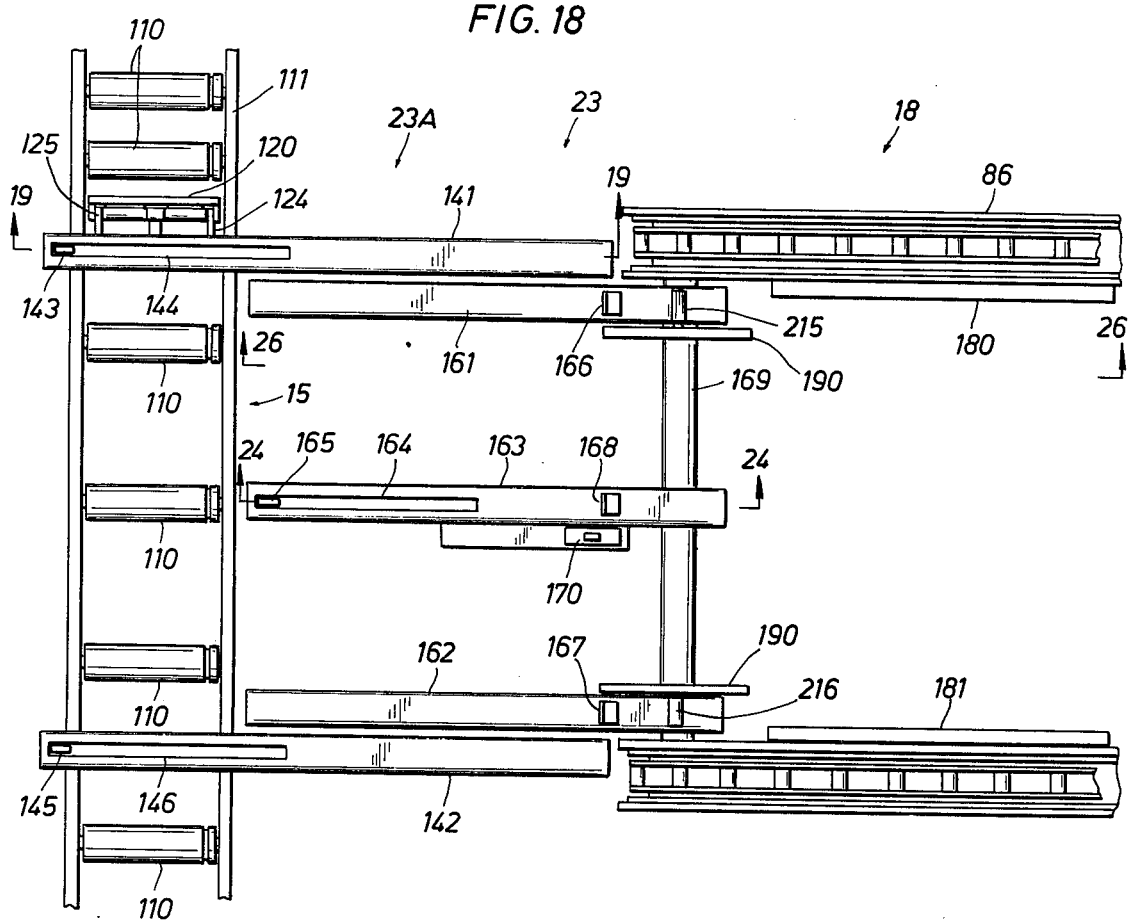
FIG. 18 is a more detailed pictorial view of another different component of the sawmill generally represented in FIGS. 1 and 2.

As hereinbefore explained, the present invention contemplates a sawmill which is composed of a plurality of modules each mounted on a supporting platform at a particular location and at one of three functional elevations hereinafter referred to as Elevations I, II and III. Referring now to FIG. 1, there may be seen a simplified functional representation of a sawmill embodying this concept with respect to such locations and different levels or elevations. Accordingly, it will be seen that the depicted sawmill is composed of a log deck assembly 2 which is perpendicularly arranged with respect to a carriage and saw section 6. As will hereinafter be explained in detail, the motive power for the carriage and saw section 6 may be provided by a suitable feedworks base section 4 aligned longitudinally with such carriage and saw section 6. The log deck assembly 2 is interconnected with the carriage and saw section 6 by a nose section 3 aligned longitudinally with the log deck assembly 2, and which is perpendicular to the carriage and saw section 6.

Referring again to FIG. 1, it will be seen that the sawmill further includes suitable roller bed sections 9 and 10, and a slab conveyor section 11, which are aligned parallel with, and along the side of, the carriage and saw section 6. Perpendicular thereto and displaced "downstream" from the carriage and saw section 6, there may be seen a pair of lumber deck assemblies 12 and 13 arranged side-by-side and extending at right angles from the roller bed sections 9 and 10 in one direction therefrom, and a transfer deck assembly 22 extending in an opposite direction from the end of the roller bed sections 9 and 10. As will be further explained in detail, the purpose of the roller bed section 9 is to carry lumber from the carriage and saw section 6 to a selected one of the two lumber deck assemblies 12 and 13, whereas the purpose of the other roller bed section 10 is to carry railroad ties or other larger such pieces from the carriage and saw section 6 to the transfer deck assembly 22. There may be further seen a third roller bed section 15 arranged perpendicularly to and across the opposite end of the transfer deck assembly 22, in parallel with the other two roller bed sections 9 and 10, which connects the transfer deck assembly 22 with the four tie deck assemblies 16–19.

Referring again to FIG. 1, it will be seen that the lumber deck assemblies 12 and 13 are each respectively interconnected with the lumber roller bed section 9 by one of a pair of lumber stacker sections 20–21, and also by one of a pair of pull-off assemblies 20A–21A, and that the transfer deck assembly 22 is interconnected with the timber roller bed section 10 by another pull-off assembly 22A. In addition, the transfer deck assembly 22 is joined at its other end to the third roller bed section 15 by a trimmer section 14 and a push-off assembly 14A.

As hereinafter stated, each of the various aforementioned components are further positioned at one of three levels or elevations, depending upon their respective functions within the system. In particular, the various lumber and tie deck assemblies 12–13 and 16–19, as well as the transfer deck assembly 22, are located at Elevation I, as are the three roller bed section 9–10 and 15. Similarly, the various stacker and pull-off sections 20–21 and 23–26 are located at Elevation I, which is the lowest of the three functional elevations in the system. The log deck assembly 2 and nose section 3 are located at Elevation II, and the carriage and saw section 6 is located at Elevation III which is the highest functional elevation in the system. The position of feedwords base 4 is at Elevation I.

As will hereinafter be explained in detail, sawlogs are positioned along the length of the log deck assembly in a manner parallel to the carriage and saw section 6. Accordingly, the nose section 3 operates to select and transfer a sawlog from the log deck assembly 2 to the carriage and saw section 6, preferably by rolling it or pushing it sideways onto the carriage portion of the carriage and saw section 6. After the log is properly secured thereon, the log is then carried longitudinally back and forth to slice it into lumber or railroad ties or the like, each board or other piece tending to fall sideways from the carriage and saw section 6 onto the appropriate one of the two roller bed sections 9–10. Those pieces considered to be lumber are, of course, longitudinally carried by the roller bed section 9 to the appropriate one of the two lumber deck sections 12–13.

As will hereinafter be explained in detail, the function of the two pull-off sections 20A–21A is to transfer the board or other piece onto the corresponding one of the two stacker sections 20–21, and that component may thereafter be employed to transfer such piece onto the selected one of the two lumber deck assemblies 12–13. Railroad ties and other such larger pieces or timbers provided by the carriage and saw section 6 will, as hereinbefore stated, be deposited longitudinally on the other roller bed section 10 to be carried to the transfer deck assembly 22. Accordingly, such railroad tie or timber is removed onto the transfer deck assembly 22 by another pull-off section 22A similar in design and function to the pull-off assemblies 20A–21A hereinbefore mentioned, whereby the transfer deck assembly 22 may carry such tie to the trimmer section 14. Thereafter, the tie is transferred onto the third roller bed section 15 by either a push-off assembly 14A, or by another pull-off assembly, for transfer to the appropriate one of the four tie deck assemblies 16–19. The system will also include four tie stacker sections 23–26, and four pull-off assemblies 23A–26A, for the purpose of removing such ties from the roller bed section 15, and for the purpose of thereafter stacking them appropriately onto one of the four tie deck assemblies 16–19 as will hereinafter be explained in detail.

Referring now to FIG. 2, there may be seen another functional representation of the various components of the sawmill depicted in FIG. 1, wherein these components are depicted with respect to movement of sawlogs and lumber throughout the system. Accordingly, the system may be seen to include a rub bar assembly 5 which prevents the carriage 27 from being thrown from the rails of the carriage and saw section 6 by the impact of the slapper bar 37 (see FIG. 14) on a sawlog having driven onto the carriage 27, a driving means 195 of conventional design for energizing the rotary saw (not specifically depicted in FIGS. 1 and 2), and a suitable cage or control booth 30 for accommodating the operator of the sawmill. Further, there may be seen that the sawmill includes a conveyor belt section 11 which is composed of an endless belt arranged beside and parallel with the carriage saw section 6 for carrying away slabs and other debris not suitable for use as lumber or railroad ties or the like. FIG. 2 also depicts the location of each triple leg assembly 200, which is a component more particularly described and depicted in FIGS. 10–12.

Referring now to FIG. 3, there may be seen another different pictorial representation of the sawmill illustrated in FIGS. 1–2 and more particularly showing the platform hereinbefore described for the purpose of supporting the various modules and components at the appropriate one of the three elevations hereinbefore mentioned with respect to FIG. 1. In particular, the platform may be seen to be composed of a plurality of vertical strength members hereinafter referred to as piers 44, which are adapted to provide the lowest Elevation I. A similar vertical strength member, hereinafter referred to as a column 45, is used to provide support for components located at the intermediate Elevation II. In addition, it may be seen that extension members 70 may be located on top of piers 44 for the purpose of also providing support at the intermediate Elevation II.

The highest Elevation III may be considered to be the top surface of the rails 74 of the carriage and saw section 6, and which is composed of a pair of railroad-type rails 74, each mounted on a rail bed member 73, which, for present purposes, may be a rectangular hollow channel member or other suitable structural device.

Referring again to FIG. 3, it may be seen that the columns 45 are intended to support both the log deck assembly (not depicted in FIG. 3) and the nose section 3, as well as a portion of each of the two rail bed members 73. Piers 44 are provided to carry longerons 50, as may be seen in FIG. 4, and the rail bed members 73 may therefore be supported on the upper ends of extension members 70 mounted on these longerons. The feedworks base 4, which supports a feedworks 42 for driving the carriage 27, is centrally supported at Elevation I by a pair of piers 44. It also includes the return stop assembly 32 which, in turn, is centrally supported at Elevation II by vertical extension members 70 mounted on piers 44, and is also connected to one end of the two rail bed members 73 for the purpose of structurally integrating these components into the assembly formed by the platform. As may be further seen, a second stop assembly 31 is mounted at the opposite ends of the rail bed members 73, at Elevation I, on one of the two longerons 50 which support the first lumber deck assembly 12, although it is also interconnected with the other ends of the two rail bed members 73 to achieve structural unity.

As hereinbefore stated, the platform composed of the piers 44, columns 45 and other members are connected together into a structural unit by the various modules such as the carriage saw section 6 and the lumber and tie deck assemblies 12-13 and 16-19 which are mounted thereon. As indicated in FIG. 3, however, one or more diagonal braces 46-47 may be suitably employed at points adjacent the ends of the carriage saw section 6, however, because of stress created by movement of the carriage 27 and its impact upon one or the other of the two stop assemblies 31-32.

The carriage 27, which is depicted in FIG. 3 and which functions to support a sawlog intended to be cut into lumber, may be of any suitable design such as that illustrated in U.S. Pat. No. 3,566,933. Accordingly, the carriage 27 may include two or more knee assemblies 28-29 and other components such as an appropriate carriage dial 179 to indicate the lateral position of the knee assemblies 28-29 and sawlog (not depicted) on the carriage 27. Accordingly, the control booth 30 is appropriately positioned adjacent to but on the opposite side of the circular saw blade 34, not only to better observe the cutting operation provided by the saw blade 34 but also to observe readings indicated by the dial 179.

Referring again to FIGS. 2-3, it will be seen that the depicted sawmill is basically composed of a plurality of functional components or modules which are interconnected together on a platform composed, fundamentally, of piers 44, columns 45 and longerons 50. The piers 44 and columns 45 are, of course, arranged in ranks and files to provide vertical support for the modules, and the longerons 50 provide strength to the platform along the files of piers 44 and/or columns 45. Accordingly, when a module such as the lumber deck 12 is disposed on two longerons 50, it also provides strength between the ranks of piers 4 which support it.

Referring now to FIG. 4, there may be seen a partial but different view of the platform depicted in FIG. 3 and composed of the various vertical structural members hereinbefore referred to as piers 44. Each of these piers 44 may be seen to be provided at its upper end with an inverted short saddle member 51 composed of a piece of channel or the like, and of a size to receive and hold, without binding, a square tubular member referred to as a longeron 50. The purpose of the various longerons 50, which are carried on files of piers 44, is to establish the aforementioned lowest functional Elevation I in the sawmill, and thus these longerons 50 operate to support either a vertical extension member 70 or an operating module such as the lumber deck assembly 12. It will therefore be seen that the lumber deck assembly 12 is composed of a pair of long saddle members 71 which, in turn, each include a spaced-apart pair of chain assemblies 86 and 87. Lumber is loaded on the two chain assemblies 86-87, and may therefore be moved laterally thereon by means of movement of movable chains therein (not depicted).

Since Elevations I and II are established by the longerons 50, it will be apparent that piers 44 and columns 45 must be appropriately mounted. As may be seen in FIGS. 5-7, such mounting is preferably performed by digging a posthole 52 an appropriate depth in the earth 63, by disposing in such posthole 62 a base pad assembly 57, and by supporting such base pad assembly 57 in the posthole 62 by means of concrete 64. More particularly, the base pad assembly 57 may be seen to be composed of a rectangular metal plate 58 and three lengths of metal supporting rod 59-61 each having one end built in the manner of a right angle. The angular ends of the rod 59-61 are appropriately welded to the underside of the plate 58, as suggested in FIG. 6, whereby the plate 58 will provide a supporting pad for the pier 44 when the base pad assembly 57 is appropriately mounted in the hole 62. After the concrete 64 has set, its level is measured by conventional means for the purpose of determining the length of the pier 44 which is necessary to support a longeron 50 at Elevation I. In this respect, the height of Elevation I above the surface of the earth 63 is not significant, but the height of Elevations II and III above Elevation I is, of course, material to the operation of the sawmill.

Referring again to FIG. 5, it will be seen that the pier 44 (or column 45) is preferably welded onto the upper surface of the plate 58 of the base pad assembly 57 and that two or more sleeves 52-53 or other tubular members are appropriately welded to the sides of the inverted short saddle 51 which is positioned on the upper end of the pier 44. It will be noted upon use of the present invention that the weight of the various components sought to be supported on the longerons 50 will be sufficient to provide immobility of these modules and components and corresponding structural integrity to the platform composed of the piers 44, columns 45 and longerons 50. In some instances, it may be desirable to further secure one portion of the platform to another, and thus it may be seen in FIGS. 5 and 7 that a U-tie bolt 54 may be inserted over the longeron 50 and through the sleeves 52-53, whereby the longeron 50 may be further connected to the pier 44 by nuts 55-56 on the ends of the U-tie bolt 54. It will also be seen, however, that this manner of interconnecting the components of the platform may also be used, as will hereinafter be depicted, to connect the modules and components of the system to the longerons 50 of the platform, and that both erection and disassembly of the sawmill are relatively simple and rapid expedients. The various piers 44 and columns 45 must, of course, be cut from the plates 58 of the various base pad assembles 57, and may not be re-useable if they are too short to support a longeron 50 at Elevation I at the new site. It is not ordinarily practical, however, to salvage the base pad assemblies 57 which are embedded in the concrete-filled holes 62.

Referring now to FIG. 8, there may be seen a detailed and pictorial representation of the portion of the platform depicted in FIG. 3 and composed of the portion supporting the carriage and saw section 6. More particularly, it may be seen that the rail bed members 73 are composed of a pair of rails 74 each mounted on elongate rectangular hollow members which are positioned on either cross-tie members 206, which are channel members carrying a pair of spaced-apart inverted short saddles 51, or on cross-tie extension assemblies 72 which, in turn, are mounted on longerons 50 at Elevation I. As further indicated in FIGS. 3 and 8, some of these longerons 50 are supported at Elevation I by piers 44, and some are supported at the intermediate Elevation II by columns 45, depending on whether the longerons 50 are located to carry a cross-tie 206 or a cross-tie extension assembly 72. As may further be seen in FIG. 8, a cross-tie assembly 72 is a unit composed of a pair of vertical extension members 70 mounted on a long saddle member 71 and carrying a cross-tie member 77. Referring again to FIG. 8, it will be noted that the long saddle member of the cross-tie extension assembly 72 is provided with a pair of sleeves 76 on each side at a location adjacent the lower ends of the vertical extension members 70. Accordingly, the cross-tie extension assembly 72 may be fixedly secured to the longeron 50 upon which it rests by a plurality of U-tie bolts 54 inserted through the sleeves 76 and extending around either the longerons 50 or the short saddle member 51 on the upper end of the pier 44.

Similar sleeves 76 may be provided on the adjacent sides of the inverted saddle members 76 positioned on the upper ends of the vertical extension members 70 for the purpose of containing U-tie bolts 54 in the manner hereinbefore explained. It will be noted, however, that these upper positioned U-tie bolts 54 engage a snubbing block 75 which is welded or otherwise affixed to the sides of the rail bed support member 73. Each rail bed member 73 rests in one of the short saddle members 51 of the cross-tie member 77, and thus the short saddle members 51 are provided with sleeves 76 located to correspond with the location of the sleeves 76 on the inverted saddle member 51 fixed to the upper end of the column 45. Accordingly, the rail bed member 73, which is also provided with a second pair of snubbing blocks 75 at this location, may be secured to the cross-tie channel member 206 and columns 45 by means of longer U-tie bolts 54 extending through the sleeves 76 on both the upper inverted short saddle member 51 fastened to the cross-tie saddle 206, and the lower inverted saddle member 51 fastened to the upper end of the column 45.

Referring now to FIG. 9, there may be seen a more detailed pictorial representation of the major components of the platform and carriage and saw section 6 depicted in FIG. 3. More particularly, it may be seen that the rails 74 are mounted on the upper surface of the rail bed members 73 and that the ends of the rail bed members 73 are arranged to mate with the base members of the two stop assemblies 31 and 32. More particularly, the rail bed members 73 are each connected to the base members 85 by means of connecting bolts 80 and nut 81 extending through each of a pair of sleeves 78 and 79 mounted on the rail bed member 73 and base member 85, respectively. Referring now to the first stop assembly 32, it will be seen that this module is composed of a pair of leg members 83 mounted on the two base members 85 and supporting in horizontal arrangement a shock-absorbing bumper 49 in a channel-like bumper holder 82. Strength is provided against impacts on the bumper 49 by angle brackets 84 as well as the tie-bolt 80 which interconnects the rail bed member 73 to the base member 85.

It will be noted in both FIG. 3 and FIG. 9 that the base member 85 of the stop member 32 rests not only on the vertical extension members 70 of a cross-tie extension 72 but also on the floor 43 of the feedworks base 4 which carries the feedworks 42. Accordingly, the floor 43 is also provided with a saddle member 65 to rest on the longeron 50 which is carried by the pier 44, and which supports the floor 43 of the feedworks base 4.

Referring again to FIG. 9, it may be seen that the other stop assembly 31 is more simply composed of a pair of vertical leg members 83 supporting an impact-absorbing bumper 48 mounted horizontally across the two base members 85 in a similar bumper holder 82. The leg members 83 are further joined to the base members 85 by a pair of short angle brackets 199. The stop assembly 31 is supported by a cross-tie extension assembly 72 on a pair of piers 44, and on another pair of piers 44 by a further assembly of components which include a cross-strut 90 spanning and interposed between the two base members 85 and a pair of horizontal struts 89, a special vertical extension column 70A and an angle bracket 70B. The special vertical extension column 70A is mounted on a short saddle member 65 for suitably engaging a longeron 50 carried by the second pair of piers 44.

Referring now to FIG. 13, there may be seen another pictorial view of a portion of the carriage and saw section 6 and also the related portions of both the supporting platform and the rail bed sections 9 and 10 and the conveyor belt section 11. More particularly, there may be seen a pictorial illustration of the longeron 50 extending across two or more piers 44 at Elevation I and supporting the vertical extension column 70 which carries the rail 74 mounted on the rail bed member 73. There may also be seen a more detailed illustration of both the roller bed sections 9 and 10 as mounted on the longeron 50, and also the conveyer belt section 11 as disposed on the longeron 50. As hereinbefore stated, the carriage 27 which rides on the rails 74 is adapted to carry a sawlog longitudinally with respect to the roller bed sections 9 and 10 and in gripping contact with the knee assemblies 28 on the carriage 27. The first cut taken from a sawlog will produce a "slab" having no value for lumber purposes but which is salvageable for purposes of conversion to pulp. Accordingly, when a slab is produced the flip board 102 which is a portion of the slab flip board section 7 is arcuately raised about the hinge 103 and the slab (not depicted in FIG. 13) may then fall into the space between the higher support member 107 adjacent the carriage 27 and the lower support member 108 and extension support member 109 on the opposite side. More particularly, the slab will fall into the U-trough 97 and onto the endless belt 113 which, as indicated in FIG. 2, will move to carry the slab away from the carriage and saw section 6 to an appropriate discharge point such as a conventional chipper assembly (not depicted). It may be seen in FIG. 2 that the endless belt depicted in FIG. 13 must travel over a substantial distance. Accordingly, and as further depicted in FIG. 13, the conveyor belt section 11 may suitably include one or more belt support rollers 96 located beneath the conveyor belt section 11 for supporting the return portion of the endless belt 113.

Referring again to FIG. 13, it will be seen that the flip board 102 rests on the lip portion of a suitable support member 106, which is mounted on the upper end of the higher support member 107, and which extends toward and immediately underneath the projecting lip or edge of the deck of the carriage 27. The purpose of the support member 106 is to span the gap between the carriage 27 and the slab flip board 102.

Referring again to FIG. 13, it will be seen that the two roller deck sections 9 and 10 are composed of a plurality of rollers 110 rotatably mounted between channels 111 which, in turn, are mounted on an array of spaced-apart lower support members 108. The purpose of the extension support member 109 is to provide for angular positioning of both the flip board 102 which is a portion of the slab flip board section 7 and the flipboard 104 which is a portion of the lumber flip board 8. The two flip boards 102 and 104 are mounted to form an inclined plane extending generally from the deck of the carriage 27 at its upper end and to the rollers 110 of the second roller bed section 10 at its lower end. Accordingly, if the piece severed from the sawlog on the carriage 27 is a slab or otherwise relatively worthless piece, the flip board 102 is raised pivotally about the hinge 103 by a pneumatic clyinder (not depicted) whereby the severed piece will thereupon fall onto the endless belt 113. If the severed piece is of salable size and shape, however, the first flip board 102 is left resting on the support member 106, and the second flip board 104 may be elevated about its hinge portion 105 by suitable means such as a pneumatic cylinder (not depicted). In this event, the severed piece will roll across the support member 106 and first flip board 102 and thereafter onto the rollers 110 composing the first roller bed section 9. As hereinbefore stated, the first roller bed section 9 is arranged to carry pieces to the lumber deck assemblies 12-13. Accordingly, the second flip board 103 will only be raised if the severed piece is of lumber dimension, and it will be left down on the upper end of the extension support member 109 if the severed piece is, instead, suitable for railroad tie purposes or the like. In this event, the severed piece will roll across the support member 106 and both flipboards 102 and 104 to the rollers of the second roller bed section 10 and may then be carried down to the receiving end of the transfer deck assembly 22.

It will be noted that the rollers 110 are provided with belt grooves 116 for receiving driving belts, whereby the rollers 110 may be rotated by suitable means to travel the severed pieces to their intended destinations. In addition, curb rails 112 are appropriately included to keep the severed pieces from sliding off of the rollers 100 during their travel thereon.

As hereinbefore stated, it is a concept of this invention to provide a sawmill composed of modules which, though functionally interconnected with each other, are substantially structurally independent of each other. Furthermore, it is another concept or feature of the invention that certain modules are constructed according to a standard design whereby they may be interchangeable, and whereby parts from one module may each be substituted for parts used for a different purpose in another module, as a temporary expedient to maintain productivity during relatively short intervals.

As an example of the interchangeability of various modules in the system depicted herein, it should be noted that the log deck assembly 2 is substantially the same as the lumber deck assemblies 12-13, the transfer deck assembly 22, and also the four tie deck assemblies 16-19. The different nomenclature employed herein is, therefore, not intended to indicate a difference in construction but only a difference in function or purpose within the system.

Referring now to FIG. 14, there may be seen a more detailed pictorial view of the log deck assembly 2 as it is functionally interconnected with the nose section 3 and carriage and saw section 6. A hereinbefore stated, the only difference between the log deck assemblies 2 and the lumber deck assemblies 12-13, transfer deck assembly 22 and the tie deck assembly-16-19, is its location and function within the saw mill hereinbefore described with respect to FIGS. 1-3. Accordingly, the log-deck assembly 2 (and also the other referenced modules) may be seen to be a structural unit resting upon a pair of spaced apart longerons 50 which, together with the aforementioned columns 45 comprise the supporting platform. The log deck assembly 2 is composed of the two chain assemblies 86-87 supported on a pair of long saddle members 71 by a plurality of vertical support members, whereby a plurality of saw logs 98 may rest on a pair of endless chains 100. A suitable driving means 101 is also preferably included for the purpose of connecting power through an appropriate gear reduction assembly 118 and driving chain 119 to drive the chains 100 in a manner to carry the saw logs 98 from one end of the log deck assembly 2 to the other end. More particularly, saw logs 98 which are brought to the saw mill by trucks and the like and loaded onto the log deck assembly 2 at one end, and are then carried by chains 100 to the other end of the log deck assembly 2 for discharge, one-by-one, onto the nose section 3 of the saw mill. Accordingly, control means (not depicted in FIG. 14) will be appropriately located in the control booth 30 whereby the operator can start and stop travel of the saw logs 98 as may be desired.

Referring again to FIG. 14, there may be seen a more detailed pictorial representation of one especially suitable form of nose section 3 and which is more particularly described and explained in the copending patent application, Ser. No. 470,338, which was filed May 16, 1974, by Harold A. Pryor and Roy R. Pryor. Accordingly, it will be noted that the nose section 3 is designed to provide two functions, i.e., the nose section 3 selectively accepts saw logs 98 from the log deck assembly 2 for transfer to the carriage 27 of the carriage and saw section 6, and it also operates to manipulate any saw log 98 which may be become juxtaposed between the log deck assembly 2 and the carriage and saw section 6.

Thus, the nose section 3 is provided with two or more crescent-shaped stop and loader members 36 which are rotatable about a driving shaft 36A, and which have a curvilinear edge to catch and support a saw log 98. More particularly, when the stop and loader members 36 are rotated in a counter-clockwise direction, the outwardly curving surface 36B of each loader member 36 will be rotated below the top of the log deck assembly 2 and the inwardly curving surface or edge 36A will be presented to accept the saw log 98 at the end of the log deck assembly 2. After a saw log 98 has rolled onto the curved edge 36A of the loader members 36, the log members 36 are rotated in an opposite clockwise direction to dump the saw log 98 carried thereon onto the sloping rails 39, and also to elevate the outwardly curved edges 36B of the log members 36 to block any other saw log 98 from rolling off of the log deck assembly 2 and onto the nose section 3.

As previously noted, a well formed saw log 98 will tend to roll up the rails 39 and into abutting engagement with the knee assemblies 29 of the carriage 27, whereby the saw log 98 may be engaged by the dogs of the knee assemblies 29 and carried to the saw blade 34. Many saw logs 98 are crooked or have flattened portions along their circumference, and may even have a vestage of one or more branches extended from their surfaces, whereby such saw logs 98 may not roll along the rails 39 in a proper manner. In the event such an irregular or reluctant saw log 98 does not travel entirely along the length of the rails 39 to the deck of the carriage 27, or if such sawlog 98 becomes irregularly positioned on the rails 39, a slapper bar 37 may be rotated in a counter-clockwise direction to strike the sawlog 98 from behind and drive it onto the deck of the carriage 27.

As hereinbefore stated, the nose section 3 is one of the modules which is structurally independent of the other portions of the sawmill. Accordingly, it may be seen that the nose section 3 is also provided with a pair of long saddle members 71 to permit the nose section 3 to be mounted as a unit on the longerons 50 which carry both the log deck assembly 2 and the carriage and saw section 6.

Referring again to FIG. 14, it will be seen that the carriage 27, which is positioned on the rails 74 carried by the rail bed members 73, is located between the rub bar assembly 5 and the nose section 3. More particularly, the carriage 27 travels from a location between the rub bar assembly 5 and the nose section 3 to and past the circular saw blade 34. When a sawlog 98 is discharged from the loader arms 36 onto the rails 39, it does not usually strike the knee assembly 29 with heavy impact. When the sawlog 98 on the rails 39 is struck by the slapper bar 37, however, the sawlog 98 will often strike the knee assembly 29 with an impact sufficient to drive the carriage 27 off the rails 74. Thus, the rub bar assembly 5 is located to backup the carriage 27 at this point.

As further indicated in FIG. 14, the rub bar assembly 5 is comprised of a pair of vertical struts 93, which supports an impact-absorbing bumper 91 located in a channel-like bumper holder 92, and which are vertically mounted on long saddle members 71. The rub bar assembly 5 further conveniently has angle brackets 94 to reinforce the vertical struts 93 against impact delivered by the sawlog 98 through the knee assemblies 29 and the deck of the carriage 27.

As indicated in FIG. 14, the nomenclature "sawlog" is conventionally applied to a log which has not previously been longitudinally sliced. After a sawlog has received at least one cut by the circular saw 34, however, the portion remaining on the deck of the carriage 27 is conventionally referred to as a "cant." Accordingly, the apparatus depicted in FIG. 14 illustrates the carriage 27 as supporting a cant 99.

It should be noted that the various moduldes are not only constructed so as to be installed in the system by merely supporting them on the longerons of the platform; many of them are further designed so as to properly space themselves, one from another, according to function. For example, the long saddle members 71 of the log deck assembly 2, the nose section 3, and the rub bar section 5, and the cross-tie saddle member 206 of the carriage and saw section 6, are of predetermined lengths such that, when butted together on the longerons 50, these modules will be spaced together in a properly functional manner within the sawmill. Since these components must also be located with respect to the saw line illustrated in FIG. 2, however, it will first be necessary to locate either the nose assembly 3 or the carriage and saw section 6 with respect to the saw line, before the other modules can be properly installed.

Referring again to FIG. 3, it will be noted that if a board or tie is to be delivered to an appropriate location along the lengths of the roller bed section 9-10, some means must be provided for stopping the board or tie as it travels along these components. This may be done by stopping the rotation of the roller member 110, but this is unsatisfactory since the board or tie will tend to continue sliding forward along the surfaces of the immobilized roller members 110.

Referring now to FIGS. 15-17, there may be seen a plurality of pictorial views of a stop assembly 115 which may be used to selectively stop a board or tie as desired, and which is preferably interconnected with a triple leg 200 in one or the other of the various roller bed sections 9-10 and 15, as will further be explained. More particularly, the stop assembly 115 may be composed of a plate 120 pivotally mounted on a rocker bar 121 by a pair of spaced-apart sleeve members 122-123. The rocker bar 121, in turn, is pivotally mounted between a pair of spaced-apart vertical arms 124-125 having a pivot rod 137 located between their lower ends. The vertical arms 124-125 are, in turn, interconnected with a pair of vertical support members 130-131 by means of a pair of pivot arms 132 and 134 interconnected at one end to the rocker bar 121, and at their other ends to a pivot rod 138 extending between the two vertical support members 130-131. Another pair of lower pivot arms 133 (only one being visible) are interconnected between the vertical arms 124-125 and the vertical support members 130-131 by the pivot rod 137 at one end and another pivot rod 136 at the other end. In addition, a pneumatic cylinder 139 is pivotally anchored at one end to the pivot rod 136 by a spacing sleeve 171, and its piston rod 140 is pivotally linked to the rocker bar 121. As indicated in FIG. 15A, extension of the piston rod 140 rotates the vertical arms 124-125 to raise the upper edge of the plate 120 above the level of the channels 111 which support the roller members 110 of the roller deck assemblies. Alternatively, and as indicated in FIG. 16, retraction of the piston arm 140 will lower the vertical arms 124-125 to retract the plate 120 below the upper surfaces of the roller members 110. Thus, when the plate 120 is elevated as indicated in FIG. 15A it will block a board or timber 114 being carried by the roller members 110. On the other hand, if the plate 120 is retracted as in FIG. 16, the timer 114 can travel past without interference by the stop assembly 115.

Referring again to FIGS 15-17, it may be seen that an appropriate limit switch 129 may be interconnected with one of the two vertical support members 130-131 to position its whisker 128 to be engaged by an actuator arm assembly 127 fixed to the rear surface of the plate 120. More particularly, the plate 120 is normally tilted against the upper ends of the vertical arms 124-125 by suitable spring means 126 to lower the end of the actuator arm assembly 127 below the whisker 128. When the plate 120 is elevated to stop a timber 114 as indicated in FIG. 15A, the colliding timber 114 will rotate the plate 120 only far enough to cause the actuating arm assembly 127 to lift the whisker 128 and thereby actuate the limit switch 129. This, as will further be explained, will actuate the appropriate pull-off assembly to remove the timber from the particular roller bed section.

Referring now to FIG. 15B, it may be seen that the actuator arm assembly 127 is preferably composed of a square hollow tube 127A of a length sufficient to reach from the plate 120 to the whisker 128 of the limit switch 129. In addition, a shorter length of rectangular tubing 127B is also provided immediately beneath the square tube 127A. The plate 120 tends to receive very heavy impacts, and thus the purpose of the rectangular or oblong tubing 127B is to provide support for the square tube 127A.

Referring now to FIG. 18, there may be seen a simplified pictorial representation of the pull-off assembly 23A, wherein it may be seen how its pull-off arms 141-142 of this portion of the sawmill are functionally positioned with respect to both the roller bed section 15 which interconnects with the four tie deck assemblies 16-19, and also with respect to the lifting arms 161-163 of the stacker section 23. As hereinbefore stated, timbers are deposited, one at a time, on the roller bed section 15 to be carried longitudinally to the appropriate one of the four deck assemblies 16-19, the appropriate one being selected by elevation of the plate 120 of a stop assembly 115 as hereinbefore mentioned. When the timber strikes the plate 120 and thereby actuates the limit switch 129 contained therein, this will actuate a pneumatic cylinder within each of the two pull-off arms 141-142, as will hereinafter be explained. Each of these two cylinders is interconnected with a dogging tooth 143 or 145 which projects above the upper surface of the two pull-off arms 141-142 on the opposite side of the timber, and thus retraction of the piston rods connected to these teeth 143 and 145 will drag the timber sideways across the pull-off arms 141-142 and, accordingly, onto the arms 161-163 of the tie stacker assembly 23.

Figure 19:
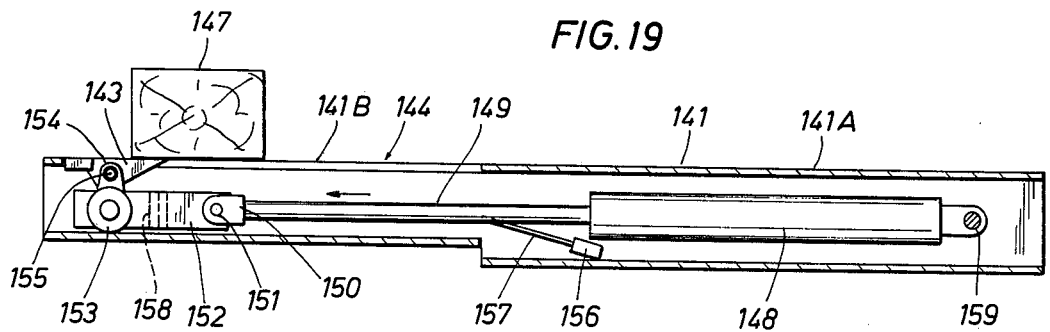
FIG. 19 is a pictorial view, partly in cross section, of the internal details of the apparatus depicted in FIG. 18.
Figure 20:
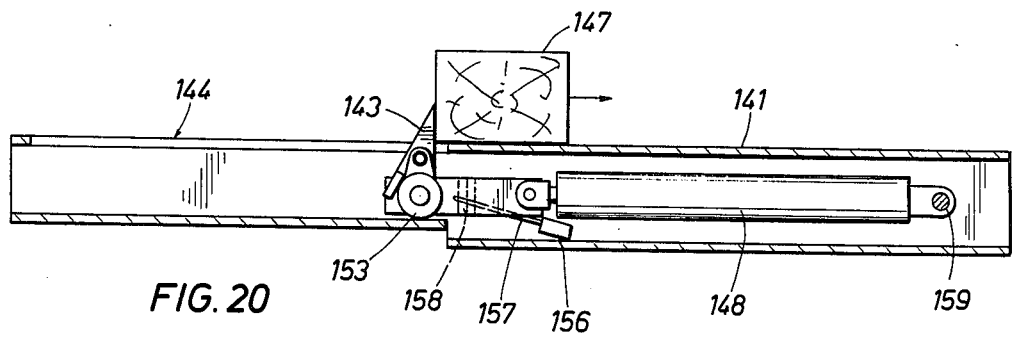
FIG. 20 is another pictorial view of the apparatus illustrated in FIGS. 18 and 19.

Referring more particularly to FIGS. 19 and 20, there may be seen a detailed representation of the internal components of the pull-off arm 141 depicted in FIG. 18 and which is similarly representative of the internal configuration of the other pull-off arm 142. Accordingly, the pull-off arm 141 may be seen to be a rectangular hollow member having a larger section 141A containing a suitable pneumatic cylinder 148, and a smaller section 141B having a slot 144 in its upper surface. The cylinder 148, which is suitably anchored by pin 159, has the free traveling end of its piston rod 149 connected to a suitable link bar 152 by a clevis 150 and clevis pin 151, and the link bar 152 is preferably disposed within the smaller portion 141B of the pull-off arm 141 on a pair of rollers 153 (only one visible in FIG. 19). The dogging tooth 143, in turn, is pivotally interconnected by a pivot pin 155 between a pair of spaced-apart tooth brackets 154 (only one visible in FIG. 19) mounted on top of the link bar 152. Referring again to FIG. 19, it will be seen that a suitable switch 156 is arranged in the larger portion 141A with a whisker 157 disposed to be deflected by an actuator projection 158, which is mounted on the side of the link bar 152, and which actuates the switch 156 upon retraction of the piston shaft 149 into the cylinder 148.

Referring again to FIGS. 19 and 20, it may be seen how the tooth 143 is arranged and adapted to engage the timber 147 to draw it onto the arms 161-163 of the tie stacker, upon retraction of the piston rod 149 into the cylinder 148, but to underride the timber 147 whenever the piston rod 149 is extended from the cylinder 148. The advantage thereby derived is that the pull-off assembly will only move a timber 147 in one direction and will not push it back onto the roller bed section 15 upon extension of the piston rod 149 for the purpose of taking a subsequent timber from the roller bed section 15.

Referring now to FIGs. 21-23, there may be seen a more detailed pictorial represenation of the link bar 152 and pull-off tooth 143. Accordingly, the link bar 152 may be seen to be a rectangular body having pinhole 160 at one end for receiving the clevis pin 151, and having a pair of rollers 153 mounted adjacent its other end. The actuator 158 may be seen to be an angular projection mounted on the side of the link bar 152 at a location suitable for timely engagement of the whisker 157 of the limit switch 156 depicted in FIGS. 18 and 19. The dogging tooth 143 may be seen to be a flat body having a right-triangular configuration and secured between the two tooth brackets 154 on top of the link bar 152 by means of the tooth pivot pin 155, and further having laterally projecting portions which act as counterweights to maintain the tooth 143 in a normally erect position relative to the link bar 152.

Referring again to FIG. 22, it may be seen that the engaging surface 143B of the tooth 143 is the longer right side of the triangle defined by the tooth 163, and that when the hypotenuse side 143A is driven against the timber 147 depicted in FIGS. 19 and 20, the tooth 143 will yieldably rotate under the timber 147 instead of displacing it from its location on the tie stacker arms 161-163. Alternatively, when the engaging surface 143B of the tooth is brought into contact with a timber 147 or the like, the tooth 143 is rotated clockwise to bring its short side into abutting engagement with the top of the link bar 152, whereby further rotation of the tooth 143 is prevented, and whereby the tooth 143 then opposes the timber 147 to displace it along the length of the arms 161-163 of the tie stacker assembly.

Referring again to FIG. 2, it will be noted that the timbers which are received from the trimmer section 14 are pushed onto the roller bed section 15 by a push-off assembly 14A. This component of the system is entirely the same as the pull-off assembly 20A, except that its tooth 143 is reversed with respect to its position as indicated in FIG. 22, and that the cylinder 148 and piston rod 149 in FIGS. 19 and 20 are operated in a manner opposite to that hereinbefore described. With such an arrangement, the hypotenuse side 143A of the tooth 143 will be drawn yieldably against the timber, to rotate the tooth 143 under the timber during retraction of the piston rod 149 into the cylinder 148, and the engaging side 143B of the tooth 143 will be pushed into contact with the timber to shove it from the trimmer selection 14 onto the roller bed section 15 upon extension of the piston rod 149 from the cylinder 148. Alternatively, of course, a pull-off assembly may be used at this location in the system instead of the push-off assembly 14A.

Referring again to FIG. 18, it will be seen that the tie stacker portion of the pull-off and tie stacker assembly 23 is composed of an arrangement of three lifting arms 161–163 which are fixedly positioned on a rotatable cross-bar 169, whereby rotation of the cross-bar 169 will elevate the lifting arms 161–163 to deposit timbers carried thereon onto the lifting pads 180 and 181 of the tie deck assembly 18.

Figure 29:
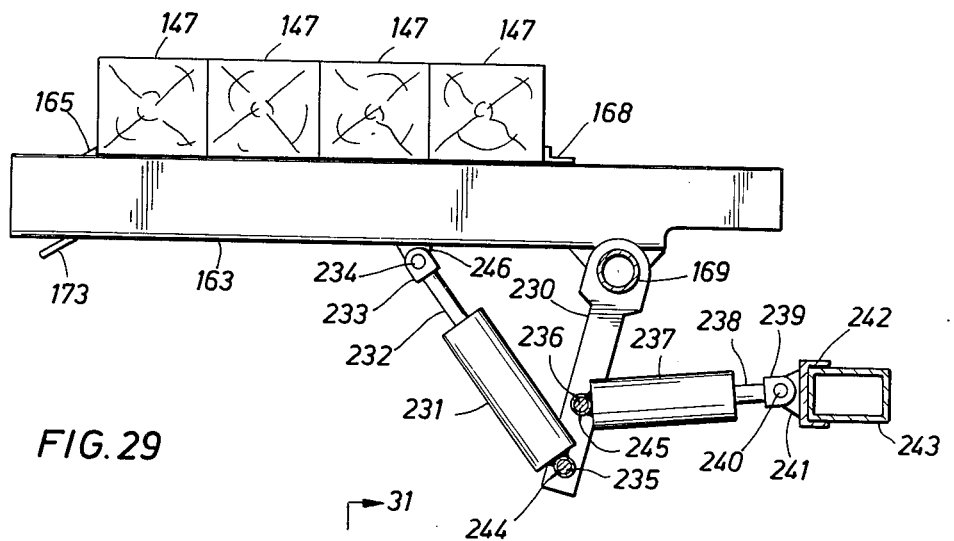
FIG. 29 is a pictorial representation of another portion of the apparatus decpited in FIGS. 26-28.
Figure 30:
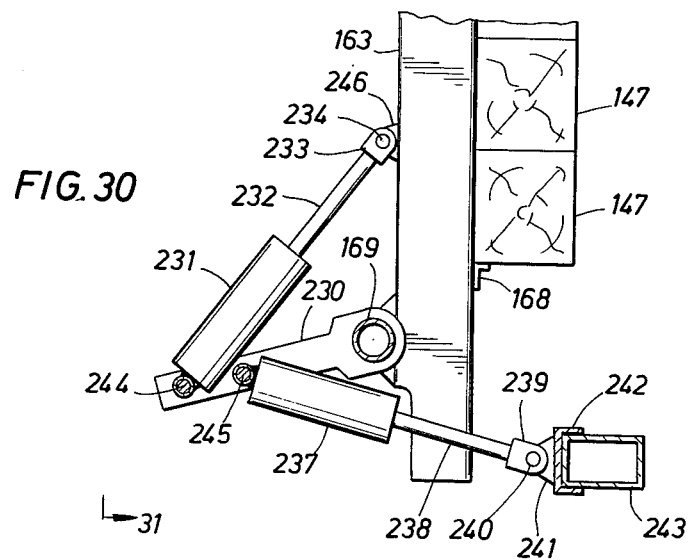
FIG. 30 is a similar pictorial view of the apparatus illustrated in FIG. 29.
Figure 31:
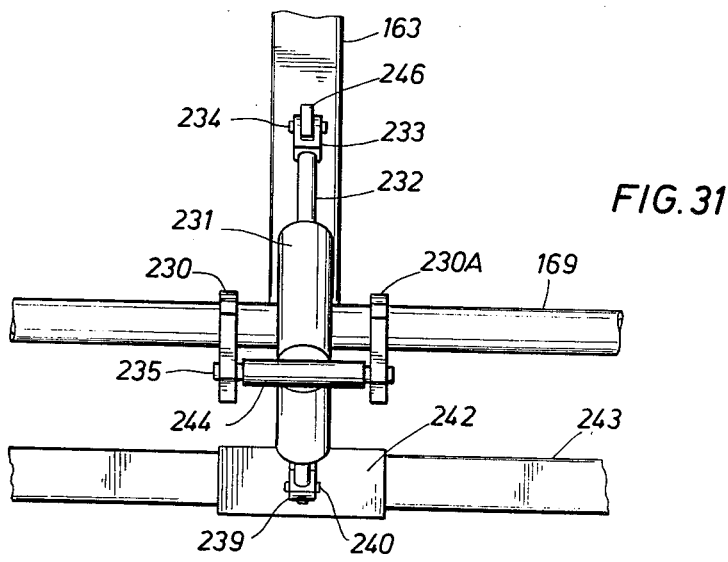
FIG. 31 is a different pictorial view of the apparatus depicted in FIGS. 29-30.

Referring now to FIGS. 29–31, there may be seen how the lifting arms 161–163 may be elevated by an arrangement of components interconnected with the center arm 163 and composed of pneumatic cylinders 231 and 237. More particularly, cylinder 231 is anchored between a pair of spaced-apart elevation arms 230–230A which are pivotally mounted at one end on the cross-bar 169, and which are pivotally connected to the cylinder 231 by an anchor pin 235 slidably disposed in a spacing sleeve 244 extending between the arms 230–230A and fixedly attached to the base of the cylinder 231. The piston arm 232 extending from the cylinder 231 is interconnected with a bracket 246 on the lower surface of the center arm 163 by a clevis 233 and clevis pin 234. The other pneumatic cylinder 237, which is anchored at its base between the arms 230–230A by a sleeve 245 and anchor pin 236, is connected at its other end through the piston shaft 238 to a bracket 241 mounted on a short saddle 242 by a clevis 239 and clevis pin 240. The short saddle 242 is, in turn, mounted on a brace 243 or other suitable portion of the platform hereinbefore described, by U-tie bolts (not depicted) as previously explained.

The particular tie stacker configuration depicted in FIGS. 29–31, wherein two cylinders are employed instead of only one, provides a number of advantages over the stackers and other similar apparatus of the prior art. In the first instance, it will be noted that whenever it is sought to elevate the center arm 163 with only one cylinder, the cylinder will necessarily assume a very sharp angle of attitude with respect to the center arm 163 either at the beginning of the elevation or at its point of termination in a vertical position, for the reason that the arm 163 is being rotated through a relatively large angle (i.e., 90° or more). With the two-cylinder arrangement depicted in FIGS. 29–31, however, the cylinders 231 and 237 always maintain a substantial angle of attitude relative to the lifting arm 163, at all points of travel between horizontal and vertical. This, in turn, provides a second advantage wherein the amount of pneumatic driving force required when the arms 161–163 are either at horizontal or vertical may be substantially reduced. In other words, when only a single cylinder is employed it must have a capability which is substantially greater than the combined capability of both of the two cylinders 231 and 237 employed as hereinbefore described.

A third advantage, which is particularly important, derives from the fact that the combination of the two cylinders 231 and 237 permits the elevation of the lifting arm 163 with a more controllable amount of force at all positions during its rotation between horizontal and vertical. Thus, the lifting arm 163 can be moved at a speed such that the timbers 147 carrried thereon are not thrown forward onto the lifting pads 180 and 181 of the tie deck assembly 18 but are stacked thereon in the manner sought to be provided with this apparatus. In this respect, it should be noted that pneumatic cylinders tend to vary with respect to their internal friction, and thus it is difficult to control such cylinders in a preselected manner whenever close tolerances of movement are required. By using a two-cylinder arrangement rather than only one, as in the case of the prior art, the two cylinders tend to cooperate in this regard, whereby they effectively operate as a single cylinder having a driving force which averages out the variations arising because of differences of internal friction in their internal components.

In normal operation of this apparatus, it is conventional as well as desirable to actuate the pull-off arms 141–142 to load five timbers 147 onto the lifting arms 161–163 of the tie stacker assembly 23, before the arms 161–163 of the tie stacker assembly are elevated to deposit this stack of timbers 147 onto the tie deck assembly 18. In actual operation, each timber 147 may be deposited across the lifting arms 161–163 only to the extent that the dogging teeth 143 and 145 can travel along the slots 144 and 146 in the pull-off arms 141–142. As each timber 147 is pulled onto the lifting arms 161–163 by the dogging teeth 143 and 145 in the pull-off arms 141–142, the subsequent timber 147 will push the preceding timber or timbers thereon further down the lifting arms 161–163. Such travel will only occur, however, until the first timber loaded thereon comes into abutting engagement with the angular stops 166–168 mounted on the three lifting arms 161–163. Thereupon, the cylinder 174 located within the center lifting arm 163 may be actuated to retract the positon shaft 176 until the clamping tooth 165 grips the last loaded timber 147 and draws all five timbers into locking engagement against the stop 168. Thus, the five timbers are held secured together by the clamping tooth 165 during elevation of the lifting arms 161–163 by the cylinders 231 and 237, thereby avoiding any tendency for the stack of five timbers 147 to topple over in disarray on the tie deck assembly 18.

Referring again to FIGS. 24–25, it will be seen that the clamping tooth 165 is a T-shaped component having its shank portion pivotally connected to the free traveling end of the piston shaft 176 by a clevis 177 and clevis pin 178 and having rollers 172 for facilitating movement of the clamping tooth 165 within and along the length of the center lifting arm 163. It will also be seen that the clamping tooth is only extended up through the slot 164 and above the surface of the lifting arm 163 when the piston shaft 176 is retracted to bring the clamping tooth 165 into engagement with the timbers 147. Thus, a portion of the lower wall section of the lifting arm 163 is preferably bent outwardly thereof in the manner of a downwardly extending flap 173, whereby the rollers of the clamping tooth 165 will roll downwardly on this flap 173 to drop the engaging portion of the clamping tooth 165 below the upper surface of the lifting arm 163, and whereby timbers 147 may be drawn onto the lifting arms 161–163 of the tie stacker assembly without interference by the clamping tooth 165.

Referring now to FIGS. 18 and 26–28, it may be seen that the outer lifting arms 161–162 are each provided with a suitable stack pusher member 190 pivotally mounted thereon by means of sleeve bearings 215 and 216. In addition, lifting pads 180–181 are appropriately mounted adjacent the inner surfaces of the two chain assemblies 86–87 of the tie deck assembly 18. More particularly, the lifting pad 180 may be seen to be pivotally supported with respect to the chain assembly 86 by means of a shorter pivot arm 183 at one end of the lifting pad 180 and a longer pivot arm 182 at its other end. In addition, a pneumatic cylinder 184 is interconnected by a pin 186 rotatably linked to a bracket 185 mounted on or adjacent the lower surface of the chain assembly 86 and having its piston rod 187 connected to the lower end of the longer pivot arm 182 by a clevis and pin assembly 188. Accordingly, when the piston rod 187 is extended from the cylinder 184, the lifting pad 180 will be elevated by the pivot arms 182–183 above the upper surface of the chain assembly 86, and when the piston rod 187 is retracted, the lifting pad 180 is retracted below the upper surface of the chain assembly 86. Although not specifically depicted in the accompanying drawings, it will be noted that the lifting pad 181 is similarly connected to and movable with respect to the other chain assembly 87.

Referring again to FIGS. 26–28, it will be noted that when the center arms 161–163 are elevated to a vertical position, the piston rod 187 is extended from the cylinder 184 to elevate the pads 180 and 181 above their respective chain assemblies 86–87, and the stack of timbers 147 carried thereon may then be deposited on the lifting pads 180–181.

When another five timbers have been received onto the lifting arms 161–163 of the tie stacker section 20, and when the arms 161–163 are again elevated to a vertical position, this additional stack of timbers will again be set down on the elevated lifting pads 180–181. To prevent the second stack of timbers from interfering with the first deposited stack of timbers 147, it will be noted that the rotatable stack pusher 190, which is rotatable freely in the appropriate one of the two bearings 215–216, and which is balanced to keep the position depicted in FIGS. 26–28, will be brought into abutting engagement with the first stack of timbers 147 to push them forward along the two lifting pads 180–181. Each time the lifting arms 161–163 are elevated to a vertical position, the two stack pushers 190 will therefore be brought into abutting engagement with the preceding stack or stacks of timbers to shove them out of the way and to thereby prevent them from being toppled over by the arrival of the subsequent stack of timbers 147.

Figure 32:
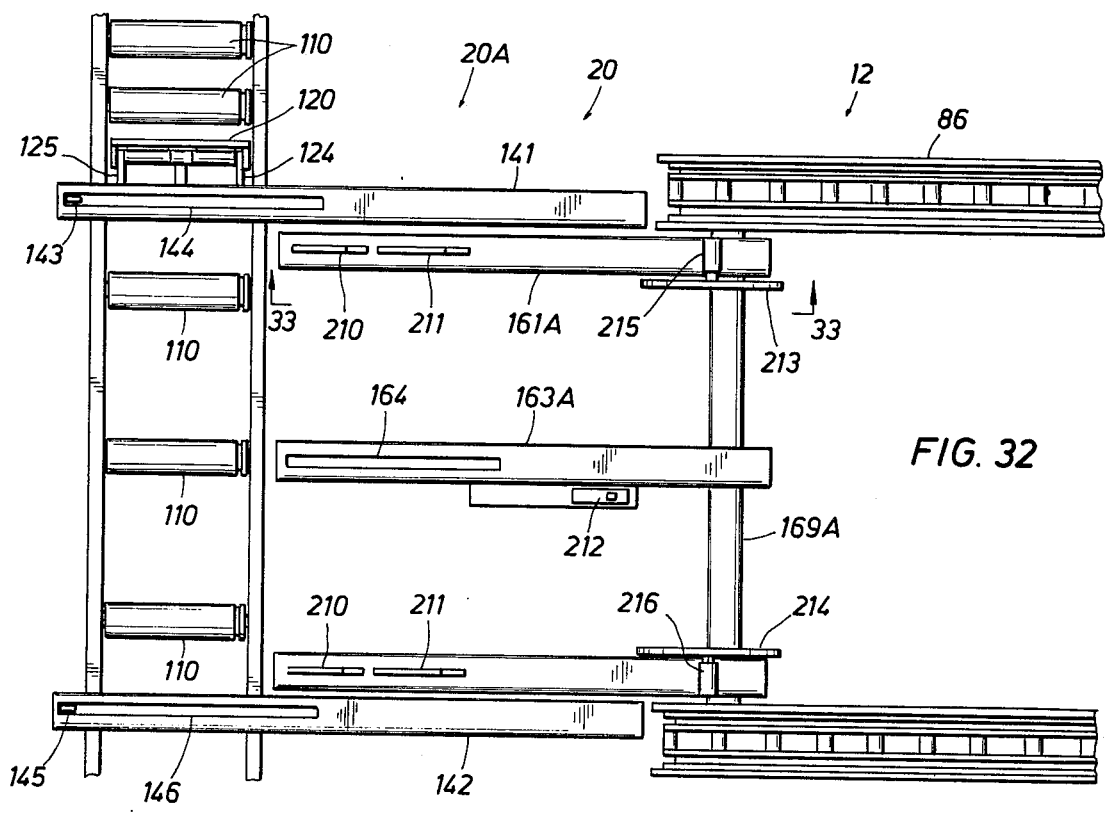
FIG. 32 is a pictorial representation of another portion of the sawmill depicted in FIGS. 1-3.
Figure 33:
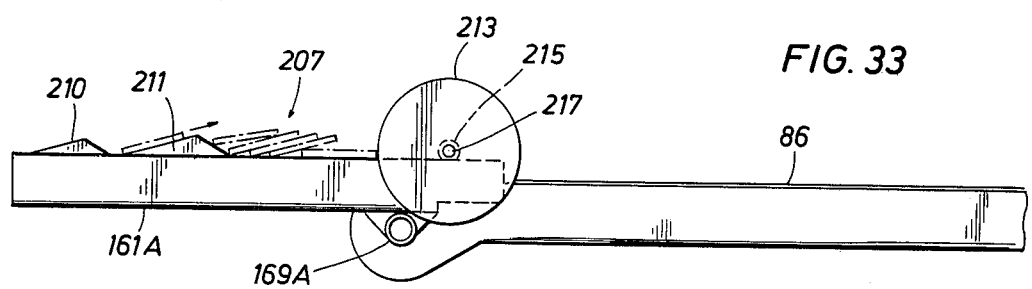
FIG. 33 is a different pictorial view of the apparatus depicted in FIG. 32.
Figure 34:
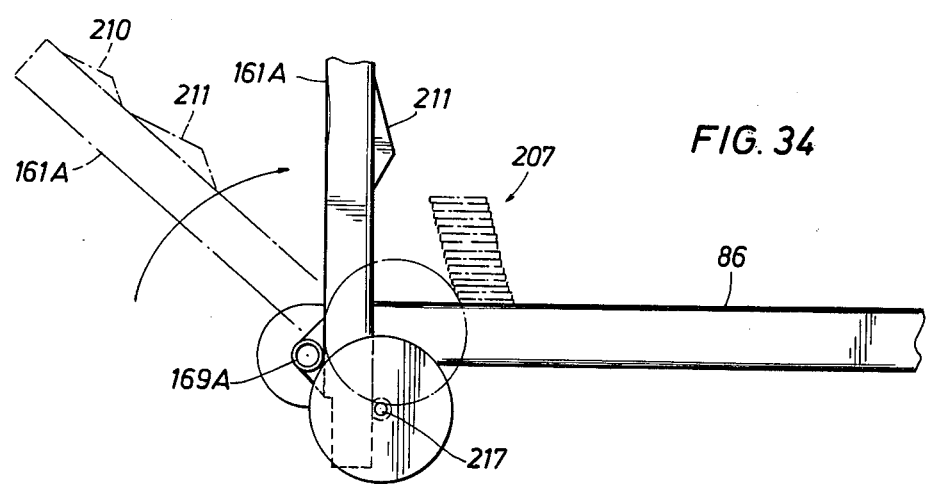
FIG. 34 is another pictorial view of the apparatus depicted in FIGS. 31-32.

As hereinbefore explained, lumber which is carried by the roller bed section 9 for loading onto the lumber deck assemblies 12 and 13 must be deposited thereon by means of the two lumber stacker sections 20–21 depicted in FIG. 2. The lumber stacker section 20 depicted in FIGS. 32–34 is basically the same as the tie stacker section 23 depicted and described in FIGS. 18 and 24–28, and is therefore elevated by the same type of apparatus depicted in FIGS. 29–31. Accordingly, it will be seen in FIG. 32 that the lumber stacker section 20 is comprised of three lifting arms 161A–163A fixedly mounted on an appropriate cross-bar 169A. It is not necessary to stack lumber received onto the lifting arms 161A–163A, however, and thus the center lifting arm 163A need not contain clamping apparatus such as the cylinder 174 and clamping tooth 165 depicted in FIGS. 24–25. The center arm 163A therefore need not be provided with the slot 164 which is required to accommodate the clamping tooth 165, as depicted in FIG. 32, but it is always convenient for purposes of interchangeability to use components of like design.

As hereinbefore stated, lumber received onto the lifting arms 161A–163A is not required to be neatly stacked in the same manner as are the timbers 147 which are carried by the lifting arms 161–163 of the tie stacker assembly, and it is only necessary that such lumber be displaced completely from the roller bed section 9 before the lifting arms 161A–163A are elevated to deposit the lumber onto the lumber deck assembly 12. However, the two outside lifting arms 161A–162A of the lumber stacker 20 are preferably provided with a pair of upwardly projecting triangular fins 210–211 to cause lumber dragged thereon by the dogging teeth 143 and 145 of the pull-off arms 141–142, to jump forward down the length of the lifting arms 161A–163A. In this respect, it will be noted that the smaller fin 210 is preferably located adjacent the end of each of the two lifting arms 161A–162A, and that the larger fin 211 is located further down the length of the arms 161A–162A. In addition, each of the two fins 210–211 is positioned with its longer side directed toward the lumber being received from the roller bed section 9.

Referring again to FIG. 32, it will be noted that since the lumber received onto the lifting arms 161A–163A is not intended to be neatly stacked onto the lumber deck assembly 12, as hereinbefore explained, the stack pusher members 190 depicted in FIGS. 18 and 26–28 are not required. On the other hand, it is desirable to provide means for preventing lumber piled onto the lumber deck assembly 12 from falling back onto the lifting arms 161A–163A, and thus discs 213–214 are preferably mounted rotatably in the sleeves 215–216 for preventing this from occurring.

Referring now to FIGS. 33–34, it will be seen how lumber 207 which is drawn onto the lifting arms 161A–163A by the dogging teeth 143 and 145 of the pull-off arms 141–142 will tend to sweep over the fins 210 and 211 to be piled in a random fashion on the lifting arms 161A–163A. When the lifting arms 161A–163A are elevated to a vertical position, the lumber 207 tends to fall forward onto the rotatable discs 213–214. Since these discs 213–214 are both freely rotatable in the sleeves 215–216, however, the lumber 207 will continue forward, away from the vertically erect lifting arms 161A–163A onto the chain assemblies 86–87 of the lumber deck assembly 12. Since the lumber deposited thereon may be accumulated in a random fashion, as hereinbefore stated, the lumber deck assembly 12 need not be provided with the lifting pads 180–181 and actuating components therefor, as previously described with respect to FIG. 18.

Referring now to FIGS. 10–12, there may be seen a detailed pictorial representation of the triple leg 200 hereinbefore mentioned with respect to FIG. 2, and more especially illustrating how this component is employed in the sawmill structure to provide a number of functions and benefits. More particularly, the triple leg 200 is designed to couple two or more portions of the various roller bed sections 9–10 and 15 together as operating units, and to support the assembled roller bed sections 9–10 and 15 on the piers 44 at the Elevation I. In addition, the triple leg 200 is designed to provide means for coupling driving power from one portion of the roller bed section to another, and to support an idling roller 193, as will hereinafter be explained. Other functions of the triple leg 200 include providing support for either portion 141A or portion 141B of a pull-off assembly 141, and to support two or more such pull-off assemblies either in side-by-side relationship or in reverse relationship wherein one of the two pull-off assemblies has had its tooth 143 reversed to provide push-off rather than pull-off, as in the case of the push-off assembly employed to transfer ties onto the roller bed section 15 from the trimmer section 14. Also, the triple leg 200 provides support for the lifting arms 161–163 of each of the tie stacker assemblies, and also for the lumber stackers depicted in FIG. 32.

Referring more particularly to FIG. 11, it will be seen that the triple leg 200 is composed of a pair of upright leg brackets 223–224 spaced apart along a short saddle 205 and each having a pair of oppositely projecting arms 203 adapted to be bolted to the adjacent ends of the channel members 111 of the roller bed section 10 or the like. The short saddle 205 is, of course, mountable on the appropriate longeron 50, and therefore is preferably provided with sleeves 76 for holding two or more U-tie bolts 54. As may further be seen in FIG. 11, the upper portion of each of the two leg brackets 223–224 is provided with a pair of upwardly extending support arms 202 spaced adjacent the ends of the channel members 11, and another pair of inside support arms 204. It will thus be seen that a pair of arms 202 and 204 function to support a pull-off assembly 141, or the idler roller member 193 may be located therebetween as illustrated in FIG. 11.

Referring again to FIGS. 11–12, it will be seen that the space between adjacent outside and inside support arms 202 and 204 accommodates the smaller portion 141B of a pull-off assembly 141, whereas the space between the two inside arms 204 will accommodate the large portion 141A of such a pull-off assembly. Accordingly, two pull-off assemblies 141 may be laid side-by-side, as hereinbefore explained.

Referring again to FIG. 11, it may be seen how the triple leg 200 functions as a connecting link for driving the various roller members 110 in two separate sections of a roller bed section 10 or the like. More particularly, it will be seen that the roller members 110 in one of the two sections will be interconnected by an endless drive belt 192, which is passed about a driving sheave or pulley 191 adapted to carry two belts. The second belt 198 carried by the two sheaves 191 is an endless member extending over a pair of pulleys 189, each of which is slidably mounted in a vertical slot 197 in the adjacent vertical leg bracket 223 or 224 of the triple leg 200. Accordingly, the two pulleys 189 may be secured in the slot 197 at an appropriate position by suitable bolts or locking means 196, in order to apply the proper amount of tension to the connecting belt 198. Thus, rotation of the belt 192 in the lefthand section of the roller bed, which rotates the roller members 110 therein, will also rotate the connecting belt 198 by rotating the sheave 191. Rotation of the connecting belt 198 will, of course, rotate the sheave 191 and roller members 110 in the other section of the roller bed section 10.

As hereinbefore stated, the triple leg 200 provides a suitable means for positioning the stop assembly 115, which is described in FIGS. 15–17. Thus, the vertical support members 130–131, which provide support for the pivot arms 132–134, may be seen to be positioned between the two leg brackets 223–224.

As hereinbefore stated, it is the function of the triple leg 200 also to provide support for the lifting arms 161–163 of the tie stacker assembly depicted in FIG. 18. Only one of the three legs of the tie stacker need be supported, however, and thus a single rest 201, having the configuration of an angle member, may be fixed to one of the two support arms 202–203, as indicated in FIGS. 10–11.

With reference to the pull-off assemblies 141, which may be laid across and supported by the triple leg 200, it should be noted that these assemblies are preferably provided with some form (not depicted) of projection for engaging one or more of the support arms 202 and 204. Accordingly, this prevents the pull-off assemblies 141 from being displaced horizontally while resting on the triple leg 200.

Figure 35:
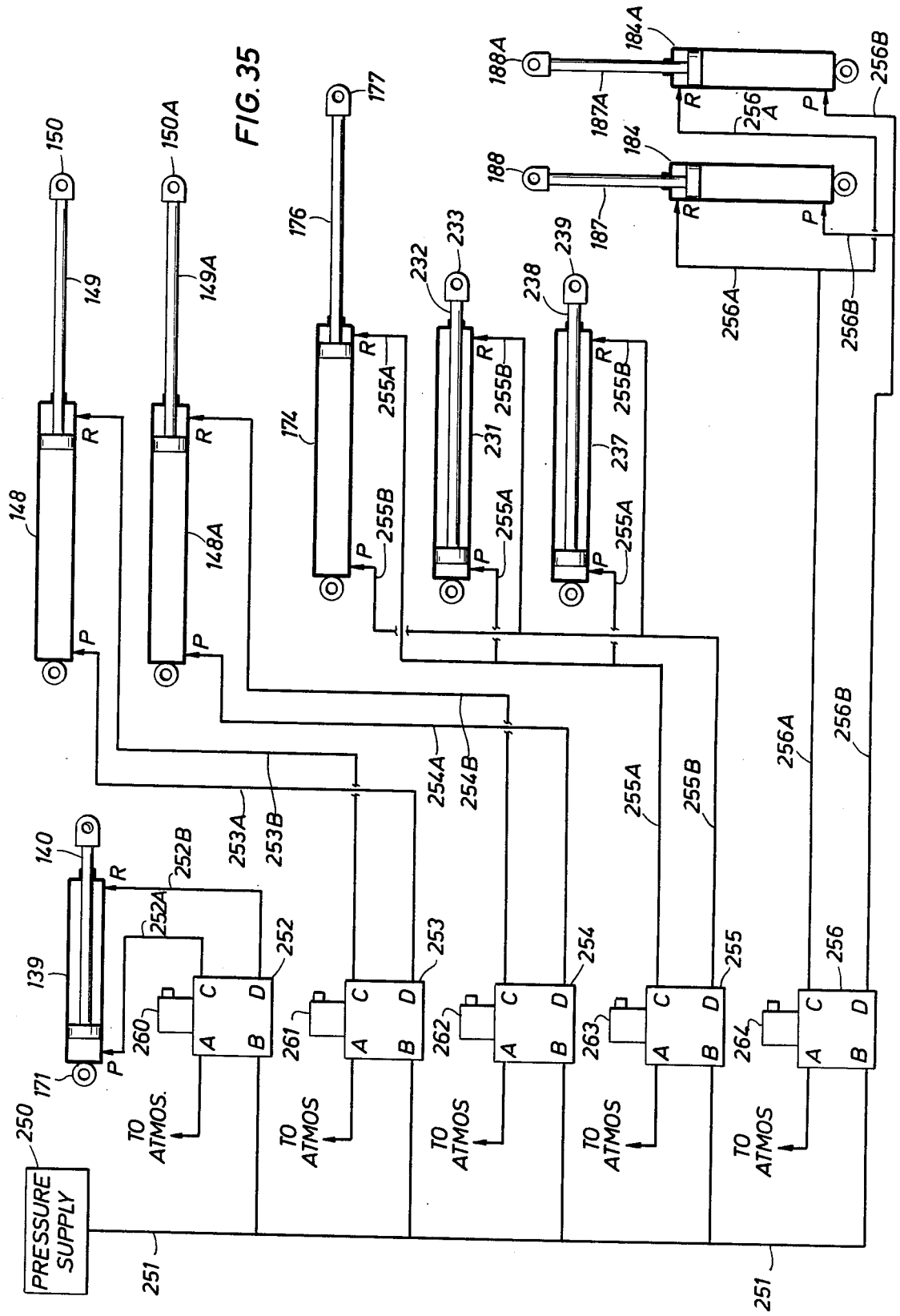
FIG. 35 is a functional diagram of a portion of the pneumatic operating components and system employed in a sawmill of the type embodying the concept of the present invention.

Referring now to FIG. 35, there may be seen a simplified functional illustration of the major pneumatically-actuated driving means hereinbefore mentioned with respect to the other components. In particular, there may be seen in FIG. 35 a functional representation of a suitable source of pneumatic pressure 250, which source 250 is suitably connected through line 251 to the pressure input ports B of each of a plurality of solenoid-actuated valves 252–256 which, in turn, have an exit port A vented to the atmosphere, an outlet pressure port C opened to intake port B upon actuation of the respective solenoid, and an intake port D coupled to a hydraulic return line 252B. The normal position of each of these valves 252–256 is to couple intake port B to exit port D therein. Thus, when the valve is actuated, port D will be interconnected with port A to provide an exhaust or return route to atmosphere, and ports B and C will be interconnected to route pneumatic pressure from the source 250 and pressure line 251 to the components sought to be energized.

Referring in particular to FIG. 35, it will be seen that the actuating cylinder of the stop assembly 115 is normally in a retracted position to position the plate 120 below the surface of the roller bed section. If the solenoid 260 is energized, however, pneumatic pressure will be coupled across ports B and C to the pressure line 252A leading to the pressure port P of the pneumatic cylinder 139, and the exhaust line 252B leading from the exit port R of the cylinder 139 will be connected through ports A and D in the valve 252 to atmosphere. Thus, energizing the solenoid 260 will extend the shaft 140 to elevate the plate 120 to intercept the timber 114, as indicated in FIG. 15A. Releasing the valve 252, however, will cause it to revert to its normal position wherein ports A and C are connected to the atmosphere, and pressure from the source line 251 through ports B and D will cause the piston shaft 140 to be retracted within the cylinder 139. Referring again to FIG. 35, it will be seen that since the pull-off assemblies are generally provided in pairs, the pneumatic system depicted in FIG. 35 herein will incorporate at least two cylinders 148 with piston rods 149. As indicated, the normal position of the valve 253 is with ports A and C interconnected and ports B and D interconnected. Thus, when the valve 253 is actuated and ports B and C are then interconnected, pressure from line 251 will be applied to line 253B and the upper intake port R of the cylinder 148. Thus, pressure from line 253B into port R in the cylinder 148 will cause retraction of the piston rod 149 therein, line 253A between port P of the cylinder 148 and port D of the valve 253 being the return route for this cylinder 148.

As hereinbefore stated, there are two cylinders involved with two pull-off arms. It is especially desirable that both cylinders operate in synchronism with each other, and thus lines 254A-B are interconnected respectively to ports P and R of cylinder 148A, the same as with lines 253A-B and cylinder 148.

As indicated in FIG. 35, the cylinder 174 which positions the clamping tooth 165 is interconnected to be controlled by the same control valve 255 which is interconnected to control the two lifting cylinders 231 and 237 depicted in FIGS. 29-31. The reason for this is that it is necessary to draw the clamping tooth 165 into compression against the stack of five timbers 147 at the very instant that the lifting cylinders 231 and 237 are energized to raise the lifting arms 161-163. On the other hand, it may also be seen in FIG. 35 that the cylinder 174 has its piston rod 176 extended whenever the piston rods 232 and 238 are retracted within cylinders 231 and 237. This is accomplished by coupling ports P of the lifting cylinders 231 and 237 to the pressure line 255A which interconnects port C of the valve 255 with port R of the clamping cylinder 174. Similarly, ports R of the lifting cylinders 231 and 237 are interconnected with line 255B which is interconnected with port P of the clamping cylinder 174. Accordingly, when the control valve 255 is energized, pressure from line 251 will be delivered through ports C and B of the valve 255 and line 255A to extend piston rods 232 and 238 at the same time that piston rod 176 is retracted within the cylinder 174 to engage the clamping tooth 165 against the stack of timbers 147.

In this regard it should be noted that the clamping cylinder 174 is not only smaller, relative to the lifting cylinders 231 and 237, but is is faster acting due to the fact that piston rod 176 will only travel a relatively short distance in either direction along its length. Accordingly, when the valve 255 is actuated, the clamping cylinder 174 will immediately draw the clamping tooth 165 into engagement with the stack of timbers 147 before the lifting cylinders 231 and 237 have lifted the lifting arms 161-163 even a short distance from horizontal. On the other hand, when the control valve 255 is released for the purpose of returning the lifting arms 161-163 to horizontal, the cylinders 174 will react immediately to disengage the clamping tooth 165 from the stack of timbers 147 before the lifting cylinders 231 and 237 have effectively moved away from vertical. Thus, the lifting arms 161-163 may be lowered away from vertical, leaving the stack of timbers 147 standing undisturbed on the lifting pads 180-181.

It should be noted that the lifting pads 180-181 are normally permitted to remain erect until a suitable number of stacks of timbers 147 have been deposited thereon, and the lifting arms 161-163 have been returned to horizontal at the end of a cycle. Accordingly, control valve 256 may be energized to connect power through line 256A to port R in the cylinder 184 which positions the lifting pad 180, and also to port R of the matching cylinder 184A which controls the other lifting pad 181. Thus, piston rods 187 and 187A will be retracted simultaneously to lower the two lifting pads 180-181 as a unit to deposit the accumulated stacks of timbers 147 onto the chains 100 of the chain assemblies 86 and 87 of the tie deck assembly 18. The chains 100 may then be shifted by the driving means 101 depicted in FIG. 14 to transport the timbers to another location to make room for a next succeeding accumulation of timbers. De-energizing the solenoid 264 will permit the control valve 256 to be returned to normal, whereby pressure from line 251 will again be supplied through ports B and D of the valve, and line 256B to ports P of the cylinders 184 and 184A. This will again extend the piston rods 187-187A to re-elevate the lifting pads 180-181, line 256A providing an exhaust route from ports R of the cylinders 184-184A to ports A and C of the valve 256.

As hereinbefore stated, the dogging tooth 143 may be reversed to permit the pull-off arms 141 and 142 in FIG. 18 to operate as a "push-off" assembly. Referring again to FIG. 35, therefore, if the cylinder 148 is incorporated in an assembly 141 which is used to push rather than pull, then line 253A will be connected to port R of the cylinder 148, and line 253B will be connected to port P, whereby the piston rod 149 will move oppositely of the manner hereinbefore explained. It will further be noted that the limit switch 156 depicted in FIGS. 19-20 must be repositioned whereby its whisker 157 will be actuated upon extension of the piston rod 149, rather than by retraction for pull-off purposes. Appropriately, therefore, the switch 156 may be located at the end of the small portion 141B of the assembly 141 whereby the whisker 157 may, for example, be deflected by the link bar 152 or one of the rollers 153.

Figure 36:
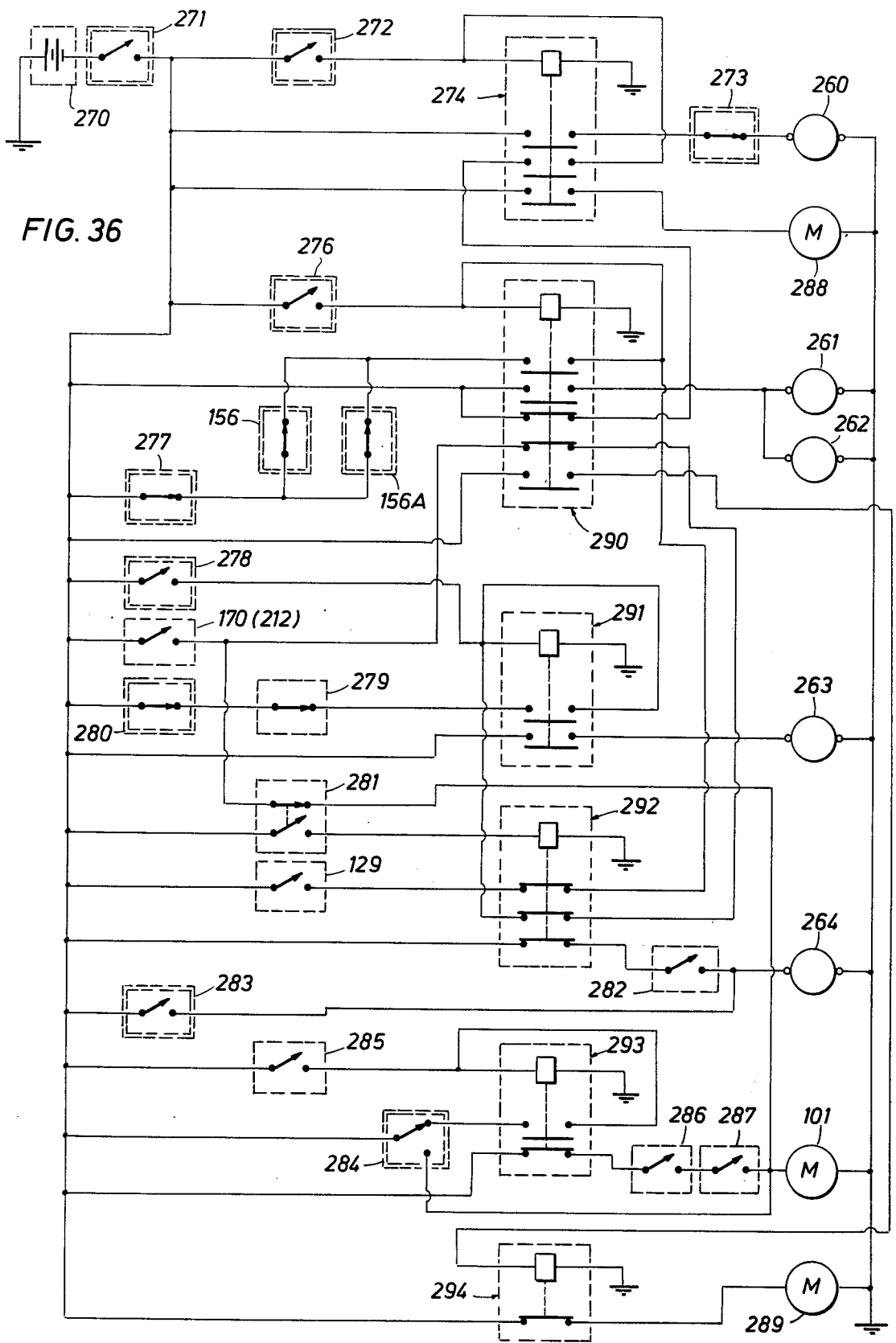
FIG. 36 is a functional diagram of a portion of the electrical operating components and system employed in a sawmill of the type embodying the concept of the present invention.

Referring now to FIG. 36, there may be seen a simplified schematic diagram illustrating the electrical circuits and control switches for operating examples of the various components hereinbefore described. In particular, circuitry illustrated therein is representative of the circuits required to control and energize the roller bed section 15, the roller bed section 9, the valves 253-254 which are necessary to operate any one of the various pull-off assemblies, the valve 255 which is required to operate any of the tie or lumber stacker sections, the motor 101 which energizes any one of the tie deck assemblies 16-19, and the valve 256 which operates any one of the lifting pads which may be found on any one of the tie deck assemblies 16-19. For purposes of simplification, it will be noted that those switches represented in FIG. 36 by double-dashed lines will be found located in the control booth 30, and those switches represented in FIG. 36 by only a single dashed line will be found located on or adjacent the component sought to be controlled.

Referring again to FIG. 36, therefore, it will be seen that a master switch 271 is provided for connecting power from a suitable electrical source 270 to the circuitry which, in turn, includes a stop relay switch 272 for energizing the solenoid of the stop positioning relay 274 in any of the various stop assemblies 115 which are located throughout the system, and which are illustrated in FIGS. 15-17. Accordingly, when the relay 274 is energized, it will be seen to couple power through the first of three sets of contacts to the solenoid 260 by way of a stop override switch 273, and also to couple power through its second set of contacts to hold the relay 274 closed after the switch 272 is reopened. In addition, power is connected through the third set of contacts of the relay 274 to energize the motor 288, whereby the plate 120 is now elevated to intercept the timber 114 being carried on the rollers 110 of the roller bed section 15. As hereinbefore stated, switch 129 is closed by impact of the timber 114 on the plate 120, whereby power is coupled through the first set of contacts of the stacker safety relay 292 to energize the solenoid of the pull-off relay 290. Note that the pull-off relay 290 may be energized at any time by the pull-off start switch 276. The pull-off relay 290 will now close to couple power from the normally closed pull-off return switch 277 and the two normally closed switches 156 and 156A to be found inside the two pull-off assemblies 141-142, to latch the pull-off relay 290 closed. Power to the solenoid of the stop positioning relay 274 will now be broken to reopen the relay 274, and the solenoids 261-262 of the pull-off control valves 253-254 will now be energized to pull the timber 114 off of the roller bed section 15 and onto the lifting arms 161-163 of the tie stacker assembly 23. Note also that when the pull-off relay 290 is energized, the motor 288 which drives the roller bed section 15 is de-energized because of reopening of the stop control relay 274.

As hereinbefore stated, retraction of the piston arms 149-149A will open the two switches 156-156A, thereby disconnecting power from the solenoid of the pull-off relay 290, whereby the solenoids 261-263 will be de-energized and the teeth of the pull-off assemblies will be returned to their normal position. When five ties 147 have been drawn onto the lifting arms 161-163 of the tie stacker assembly 23, and when switch 170 has been closed, power will now pass through the appropriate contacts of the now reclosed pull-off relay 290 and the middle contacts of the normally closed stacker safety relay 292 to energize the solenoid of the stacker relay 291. Closing this component will connect a latching circuit to the relay by way of its first two contacts and the stacker limit and return switches 279-280, and will contact power through its second two contacts to energize the solenoid 263 of the stacker control valve 255. Accordingly, the lifting arms 161-163 of the tie stacker assembly will now be elevated.

As soon as the arms 161-163 are elevated a short interval, however, the stacker safety switch 281 will be released to close its bottom contacts to energize the stacker safety relay 292. Power will now be disconnected from the solenoid of the pull-off relay 290 to keep the pull-offs from operating while the lifting arms 161-163 of the stacker section are in an elevated position. In addition, power is further disconnected from the coil of the stacker relay even though the switch 170 is still closed by the weight of the ties 147. Note further that, when the stacker safety relay 292 is opened, the lifting pads may not be retracted even if the solenoid 264 of the pad control valve 256 is energized by closure of the pad-down limit switch 282.

When the lifting arms 161-163 reach their full point of elevation, this will open the stacker limit switch 279 to break the latching circuit which is holding the stacker relay closed. Note that this same effect can be achieved, of course, by opening the stacker return control switch 280 located in the control booth 30. Power will now be removed from the solenoid 263 of the stacker control valve 255, whereby the lifting arms 161-163 will be returned to their horizontal position to await arrival of the next timber being carried on the roller bed section 15. At this point, it will be noted that the stacker safety switch 281 is returned to its normal position, thereby breaking the circuit to the coil of the stacker safety relay 292, which will now revert to its closed position, reconnecting power to the pad-down limit switch 282. If this component has been closed, the solenoid 264 of the pad control valve 256 will be energized to actuate cylinders 184-184A. In this regard, it may be noted that solenoid 264 may be energized at any time by closure of the lifting pad control switch 283.

As hereinbefore explained, whenever a preselected number of stacks of ties has been received on the lifting pads 180-181, the pads-down limit switch 282 will be closed to connect power to the solenoid 264 of the pad control valve 256. The pads 180-181 will now be retracted by the cylinders 184-184A until the deck start switches 286-287 (one being actuated by each pad) are closed to couple power to the motor 101 which shifts the stacks of ties along the tie deck assembly and away from the pads until the pads-down limit switch is released to de-energize solenoid 264. The pads 180-181 will then be re-elevated to release the deck start switches 286-287 and thus de-energize the motor 101. When a stack of ties is carried to a certain distance along the tie deck assembly, however, it will eventually depress and close the deck limit switch 285 to disconnect power to the coil of the deck safety relay 293. If the deck control switch 284 is positioned as illustrated in FIG. 36, power will now be connected through the upper pair of contacts of the deck safety relay 293 to provide a latching circuit for this component, and power will be disconnected from the deck start switches 286-287 to stop the motor 101 and thereby prevent ties from being carried off the end of the tie deck assembly. Positioning the deck control switch 284 to its alternative position will break the latching circuit to the deck safety relay 293 to permit it to return to its normal position, and will also connect power to re-energize the motor 101 as long as long as switch 284 is in its alternative position.

As may be seen in FIGS. 32-34, a typical lumber deck assembly 12 will not be provided with the lifting pads 180-182 which are incorporated with the tie deck assemblies. In addition, the motor 288 which operates the roller bed section 15 will not be involved with the operation of the lumber stackers, but the lumber roller bed section 9 having motor 289 will be involved. Accordingly, the lifting arms 161A-163A of the lumber stacker 20A depicted in FIG. 32 will be elevated upon actuation or closure of switch 212 to again connect power to the relay 291, the same as hereinbefore described. Actuation of the switch 129 will again close the pull-off relay 290 to pull a board or plank onto the lifting arms 161A-163A of the lumber stacker 20. Note that power is now applied through the bottom two contacts of relay 290 to energize the lumber roller bed stop relay 294 to break the energized circuit to the motor 289 which drives the roller bed section 9. When switch 212 is closed, this will again energize the relay 291 to again energize the solenoid 263, as hereinbefore described. As soon as switch 212 is closed, power will be connected through the stacker safety switch 281 to energize the tie deck motor 101, as well as to energize the stacker relay 291. As soon as the lifting arms 161A-163A are elevated far enough to release the stacker safety switch 281, however, power will be removed from the tie deck motor 101 and will be connected to actuate the stacker safety relay 292. Thus, the lumber deck assembly will be actuated to carry lumber previously deposited thereon only far enough to remove it from lumber again being deposited thereon by the rising lifting arms 161A-163A.

As hereinbefore stated, the hollow longerons 50 are not only employed to support the various modules but are also used to provide support as well as protection for electrical cables which must necessarily be extended between the components previously discussed with respect to FIG. 36. On the other hand, access is required to these cables at points intermediate the ends of the longerons 50, and also provision must be had for connecting other similar ducts to the longerons 50 at selected locations between their ends.

Figure 37:
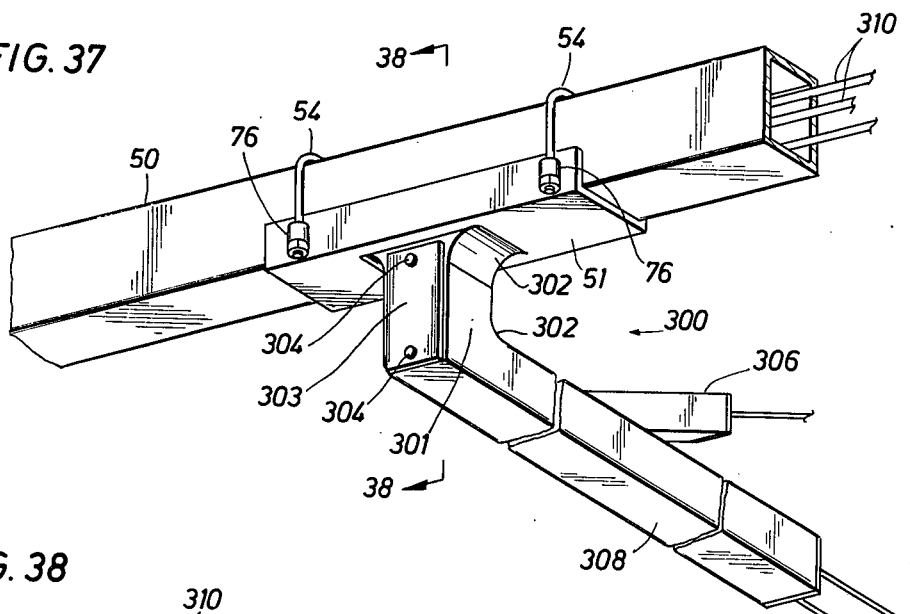
FIG. 37 is a pictorial representation of means for protecting and supporting electrical cables and leads required to energize the apparatus depicted in FIG. 36.
Figure 38:
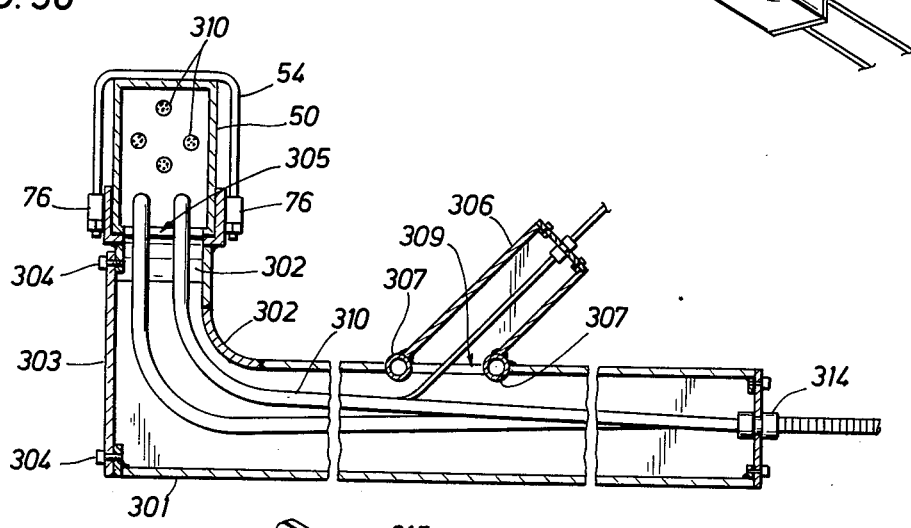
FIG. 38 is a pictorial representation, partly in cross section, of the apparatus depicted in FIG. 37.
Figure 39:
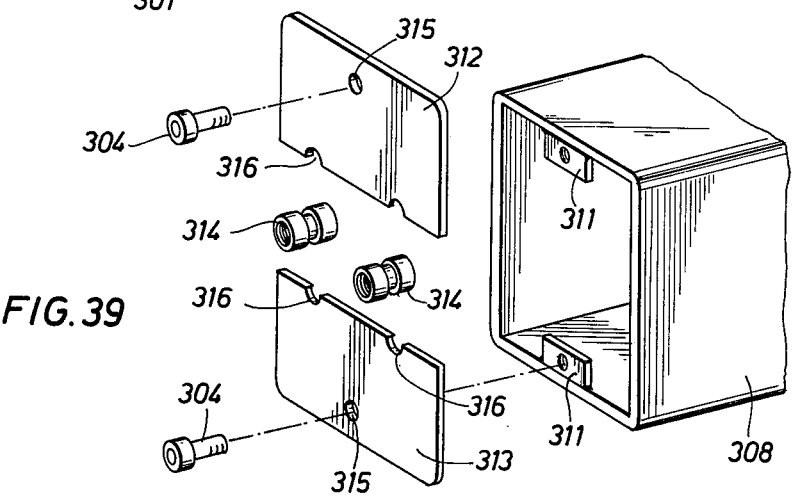
FIG. 39 is an exploded pictorial representation of a portion of the apparatus illustrated in FIG. 38.

Referring now to FIGS. 37-39, there may be seen pictorial illustrations of apparatus which has been found particularly suitable for this purpose. Referring more especially to FIG. 37, there may be seen an exemplary form of duct assembly 300 which includes a junction box 301 adapted to be interconnected between an aperture 305 (see FIG. 38) in the bottom of the longeron 50 and a rectangular duct extending at right angles to the longeron 50. More especially, the junction box 301 may be seen to be provided with curvilinear surfaces 302 to support the cables 310 contained therein against deformation or damage, such surfaces or curvilinear wall portions 302 being conveniently provided by taking a one-fourth round section of the wall of a metal tube or the like of proper radius. The junction box 301 may be seen to be interconnected with an inverted short saddle 51 which, as hereinbefore described, may be connected with the longeron 50 by means of U-tie bolts 54 and sleeves 76.

Referring now to FIG. 38, it may be seen that access may be had to the cables which transfer from the junction box 301 to the longeron 50, either by disconnecting the U-tie bolts 54 and removing the junction box 301 from the longeron 50, or by removing the access door 303 which is connected to the end of the junction box 301 by means of screws 304 or other suitable fasteners.

As indicated in FIGS. 37-38, provision may be required for connecting an extension duct 306 to the duct 308 at an angle less than 90°. This may be conveniently effected by providing a pair of pipe sections 307 to the sides of an aperture in the duct 308, and by thereafter welding the extension 306 to the pipe sections 307. The advantage of employing pipe sections 307 in this manner is that their surfaces are rounded to protect the cables from abrasion, and thus similar components may conveniently be used at the aperture 305 in the longeron 50.

Referring now to FIG. 39, there may be seen a pictorial representation of the components which secure and protect electrical cables 310 when extending out of a duct 308 or the like. More particularly it will be noted that brackets 311 may be secured to spaced-apart edges of the end of the duct 308, and may also be provided with threaded apertures for receiving the screws 304. The opening in the end of the duct 308 is preferably closed by a pair of plates 312-313, each of which has a screw aperture 315 for matching the hole in the brackets 311, and which is also provided with one or more spaced-apart circular recesses 316. Accordingly, when the plates 312-313 are secured to the end of the duct 308 by the screws 304, the end of the duct 308 will be closed except for one or more holes formed by the matching recesses 316. Thus, one or more suitable couplings 314 are preferably provided in the recesses 316 to fixedly secure cables passing out of the duct 308 in the manner depicted in FIG. 38. Note also that means such as the plates 312-313 may be employed instead of the access door 303 in FIG. 38.

Referring again to FIG. 14, it will be noted that the elevation and tilt of the rails 39 of the nose section 3 should be rather precisely established in order that a sawlog 98 will roll properly onto the deck of the carriage 27. Accordingly, a plurality of shims 225 and the like are preferably included as a part of the nose section 3, whereby the positioning of this module may, from time to time, be selectively convenient.

Referring again to FIG. 4, it will be noted that lumber deck assembly 12 is depicted as straddling two longerons 50. Such an assembly may be constructed to straddle or rest on three or more longerons 50 to accommodate boards of greater length, of course, without departing from the concept of the present invention. In this regard, the log deck assembly 2, the nose section 3, and the other modules of the system may be similarly adapted.

The concept of a modular-type sawmill depends, of course, on the definition of the term "module." As used herein, therefore, a module is any component of the system which, like the nose section 3 and log deck section 2, is both self-contained and independently operable. Accordingly, the components described and depicted herein, which are considered to be modules are the log deck section 2, the nose section 3, the carriage and saw section 6, the conveyor assembly as hereinafter described, each of the two lumber deck assemblies 12-13, the transfer deck assembly 22, and each of the tie deck assemblies 16-19. The conveyor assembly is composed of the two roller bed sections 9-10 and the conveyor belt section 11, the various triple legs 200 interconnected therein, the stop assemblies 145 in the triple legs 200, and the flip board sections 7-8. The pull-off assemblies 20A-21A, and other like components, are also a part of the conveyor assembly inasmuch as they are supported by the triple legs 200 rather than being disposed on longerons 50. Similarly, the lumber stacker sections 20-21 and the tie stacker sections 23-26 are part of the lumber deck and tie deck assemblies 12-13 and 16-19, respectively, since they are mounted on these components rather than on longerons 50 as self-contained modules.

Referring again to FIGS. 1 and 2, it should be noted that the log deck assembly 2, the two lumber deck assemblies 12-13, the transfer deck assembly 22, and the four tie deck assemblies 16-19 are all basically the same in design. Any differences such as the tie stackers 23-26 are additions only, and thus all of these components are basically interchangeable.

It will be apparent from the foregoing that many other variations and modifications may be made in the structures described herein without substantially departing from the basic concept of the present invention. Accordingly, it should be clearly understood that the forms of the invention described herein and depicted in the accompanying drawings are exemplary only and are not intended as limitations in the scope of the present invention.

What is claimed is:

1. In a sawmill and the like including a conveyor means for conducting timbers and other elongate bodies along a path to a preselected location, and a deck assembly adjacent said location for receiving and holding said bodies, the improvement in combination therewith comprising stacking means disposed adjacent said location and having arcuately movable arm members extending from said deck assembly to said conveyor means for receiving and laterally supporting said bodies arriving at said location, shifting means fixed in a substantially horizontal plane and associated with said stacking means and extending across the path of travel of said conveyor means for shifting said bodies onto said arm members toward said deck assembly, and driving means for rotating said arm members of said stacking means about an axis adjacent said deck assembly to deposit said bodies onto said deck assembly.

2. The improvement described in claim 1, further including removal means disposed at said location along said path for laterally removing said bodies from said conveyor means onto and across said arms of said stacking means.

3. The improvement described in claim 2, further including stop means for receiving and stopping selected ones of said bodies at said location and energizing said removal means.

4. Apparatus for receiving and stacking timbers and other elongate bodies in a sawmill and the like, comprising
- a roller bed assembly for conducting said body longitudinally along a path and to a predetermined location,
- a stacking assembly having a plurality of parallel arm members extending perpendicularly to said roller bed assembly from an axis aligned with and spaced from said roller bed assembly,
- pull-off means fixed in a substantially horizontal plane and interconnected with said roller bed assembly for laterally transferring onto said arm members of said stacking assembly each of said elongate bodies arriving at said location along said path,
- gripping means responsive to the accumulation of a preselected number of said bodies onto said arm members for securing said accumulated bodies to said arm members of said stacking assembly, and
- driving means functionally interconnected with said gripping means for arcuately rotating said arm members about said axis.

5. A system for receiving and stacking timbers and other elongate bodies in a sawmill and the like, comprising
- conveyor means for conducting said bodies longitudinally and along a prescribed path in said sawmill,
- deck means spaced from and perpendicularly extending from said conveyor means at a preselected location along said path,
- stacking means interposed between said deck means and said conveyor means and having a plurality of arms extending from said deck means perpendicularly to said conveyor means at said preselected location along said path,
- transfer means fixed in a substantially horizontal plane at said location for laterally shifting said elongate bodies onto said arms of said stacking means, and
- driving means for arcuately lifting said arms from said conveyor means to a substantially vertical position to deposit said bodies carried thereon to said deck means.

6. In a sawmill and the like comprising a conveyor means for conducting timbers and other elongate bodies along a path to a preselected location, and a deck assembly adjacent said location for receiving and holding said bodies,
the improvement in combination therewith including
- stacking means disposed between said deck assembly and said conveyor means and having a plurality of spaced-apart arm members extending pependicularly to said conveyor means at said location and arcuately movable about an axis adjacent said deck assembly,
- removal means fixed in a substantially horizontal plane at said location for laterally shifting said bodies from said conveyor means and onto said arm members of said stacking means,
- transfer means interconnected with said stacking means for further shifting said bodies loaded onto said arm members thereof from said means arm members toward said, deck assembly, and
- driving means interconnected with said stacking means for elevating said arm members to a substantially vertical position to deposit said bodies onto said deck assembly.

7. Apparatus for receiving and stacking timbers and other elongate bodies conducted longitudinally along a path in a sawmill and the like, said apparatus comprising
- a rotatable member aligned with and spaced from said path at a preselected location therealong,
- a plurality of spaced-apart finger members each fixedly mounted to one end to said rotatable member and extending to said path at said preselected location to receive and support said bodies,
- driving means for moving said rotatable member to arcuately travel said finger members between a first generally horizontal position and a second generally erect and vertical position,
- an actuating assembly anchored in one of said finger members and movably extending toward said path,
- a hook-like member pivotally mounted on the end of said piston rod and having an engaging portion extendable upwards from said one finger member for abutting engagement with said bodies to be secured on said finger members, said hook-like member being fully retractable within said one finger member.

8. The apparatus described in claim 7, wherein said driving means comprises
- a pair of spaced-apart lever members each fixedly connected at one end to said rotatable member,
- a pair of first actuating means each having a first portion pivotally connected to the other end of one of said lever members and further having a second portion pivotally connected to one of said finger members and extendable and contractable with respect to said first portion thereof, and
- a pair of second actuating means each having a first portion pivotally connected to one of said lever members between said rotatable member and the corresponding one of said first portion of said first actuating means and further having a second portion pivotally anchored relative to said apparatus and extendable and contractable with respect to said first portion of said second actuating means.

9. The apparatus described in claim 8, wherein said actuating means each comprise a pneumatically-actuated cylinder assembly wherein said first portion corresponds to a cylinder and said second portion corresponds to a piston rod thereof.

10. The apparatus described in claim 9, further including transfer means interconnected with one of said finger members for shifting bodies deposited thereon laterally toward said rotatable member.

11. The apparatus described in claim 10, wherein said transfer means comprises
- a pair of first skipping members each erected on one of said finger members for skipping lumber received on said finger members toward said rotatable member, and
- a pair of second skipping members each erected on one of said finger members between said first skipping members and said rotatable member for further skipping said lumber toward said rotatable member.

12. The apparatus described in claim 9, further comprising first switching means actuable by one of said bodies carried on said finger members for energizing said actuating assembly, and second switching means responsive to actuation of said first switching means for energizing said first and second pneumatically-actuated cylinder assemblies.

13. The apparatus described in claim 12, wherein said actuating assembly is de-energized when said arcuately movable finger members are moved to said erect and generally vertical position.

14. The apparatus described in claim 9, further including stop means mounted on at least one of said finger members adjacent said rotatable member, and clamping means interconnected with at least one of said finger members for securing a plurality of said bodies onto said finger members.

15. Apparatus for receiving and stacking timbers and other elongate bodies conducted longitudinally along a path in a sawmill and the like, said apparatus comprising a rotatable member aligned with and spaced from said path at a preselected location therealong, a plurality of spaced-apart finger members each fixedly mounted at one end to said rotatable member and extending to said path at said preselected location to receive and support said bodies, driving means for moving said rotatable member to arcuately travel said finger members between a first generally horizontal position and a second generally erect and vertical position, transfer means interconnected with one of said fingers for shifting bodies deposited thereon laterally toward said rotatable member, said transfer means comprising a pair of first skipping members each erected on one of said finger members for skipping lumber received on said finger members toward said rotatable member, a pair of second skipping members each erected on one of said finger members between said first skipping members and said rotatable member for further skipping said lumber toward said rotatable member, and wherein said skipping members each have a fin-like configuration corresponding to an isosceles triangle and are erected on said finger members with their shortest side directed toward said rotatable member.

16. The apparatus described in claim 15, wherein said second skipping members are larger than said first skipping members.

17. The apparatus described in claim 16, further including discharge means interconnected with at least one of said finger members for discharging said bodies carried on said arcuately movable finger members.

18. The apparatus described in claim 17, wherein said discharge means is a disc-like member rotatably mounted on one of said finger members adjacent said rotatable member for discharging lumber carried on said finger members.

19. The apparatus described in claim 7, wherein said one finger member is further provided with a slot-like aperture along a portion of its upper wall for slidably accommodating said engaging portion of said hook-like member and another aperture in its lower wall for partially receiving said hook-like member.

* * * * *